(12) United States Patent (10) Patent No.: US 8,311,908 B2
Maguire, III et al. (45) Date of Patent: *Nov. 13, 2012

(54) CONVERSION ENGINE AND FINANCIAL REPORTING SYSTEM USING THE CONVERSION ENGINE

(75) Inventors: James B. Maguire, III, Scotch Plains, NJ (US); Jun Iwata, Fountainville, PA (US); Thomas Nichols, Manasquan, NJ (US); Jay Cleary, New York, NY (US); Maurice Houeix, Brooklyn, NY (US); Mary Rudock, Pittsburgh, PA (US); Naoki Matsumura, Tokyo (JP)

(73) Assignees: Sumitomo Mitsui Banking Corporation, New York, NY (US); Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/458,692

(22) Filed: Jul. 20, 2009

(65) Prior Publication Data

US 2010/0169193 A1 Jul. 1, 2010

Related U.S. Application Data

(60) Division of application No. 10/371,181, filed on Feb. 24, 2003, now Pat. No. 7,565,311, which is a continuation of application No. 10/177,764, filed on Jun. 24, 2002, now abandoned, which is a continuation of application No. 09/976,289, filed on Oct. 15, 2001, now abandoned, which is a continuation of application No. 09/775,801, filed on Feb. 5, 2001, now abandoned, which is a continuation of application No. 09/563,913, filed on May 4, 2000, now abandoned.

(60) Provisional application No. 60/171,097, filed on Dec. 16, 1999.

(51) Int. Cl.
*G07B 17/00* (2006.01)
*G07F 19/00* (2006.01)
(52) U.S. Cl. ............... 705/30; 707/203; 709/246; 705/1
(58) Field of Classification Search .................. None
See application file for complete search history.

(56) References Cited

U.S. PATENT DOCUMENTS 4,321,672 A 3/1982 Braun et al.
(Continued)

FOREIGN PATENT DOCUMENTS

EP 0 294 187 6/1988
(Continued)

OTHER PUBLICATIONS

IBM Technical Disc. Bulletin, "*Financial Systems Interface*"; Oct. 1, 1988; vol. 31, No. 5; pp. 36-39.

(Continued)

*Primary Examiner* — Luna Champagne
(74) *Attorney, Agent, or Firm* — Nixon & Vanderhye, P.C.

(57) ABSTRACT

A computerized management system is provided. The system includes a routine for accessing journal entries stored in a memory and an automated journal entry generating routine for generating journal entries for a first set-of-books and for a second set-of-books based on the accessed journal entries. The journal entries for the first set-of-books are in accordance with a first reporting standard and the journal entries for the second set-of-books are in accordance with a second, different reporting standard.

11 Claims, 13 Drawing Sheets

U.S. PATENT DOCUMENTS

| | | | |
|---|---|---|---|
| 5,050,078 A | 9/1991 | Sansone | |
| 5,483,445 A | 1/1996 | Pickering | |
| 5,537,591 A | 7/1996 | Oka | |
| 5,778,350 A | 7/1998 | Adams et al. | |
| 5,794,218 A | 8/1998 | Jennings et al. | |
| 5,875,435 A | 2/1999 | Brown | |
| 5,878,405 A | 3/1999 | Grant et al. | |
| 5,884,274 A | 3/1999 | Walker et al. | |
| 5,897,645 A | 4/1999 | Watters | |
| 5,930,773 A | 7/1999 | Crooks et al. | |
| 5,950,174 A | 9/1999 | Brendzel | |
| 5,966,700 A * | 10/1999 | Gould et al. | 705/38 |
| 5,999,913 A | 12/1999 | Goodwin, III | |
| 6,058,375 A | 5/2000 | Park | |
| 6,477,510 B1 * | 11/2002 | Johnson | 705/30 |
| 7,565,311 B2 | 7/2009 | Maguire, III et al. | |

FOREIGN PATENT DOCUMENTS

| | | |
|---|---|---|
| JP | 06-119362 | 4/1990 |
| JP | 10-091694 | 4/1998 |
| JP | 10-171908 | 6/1998 |
| JP | 11-338936 | 12/1999 |
| WO | 97/24658 | 7/1997 |

OTHER PUBLICATIONS

Mibu, Yoneaki, "ERP & Accounting Package for International Accounting Standards", Network Computing, February issue 1999, Ric Telecom Ltd., Feb. 1, 1999, vol. 11, Issue No. 2, pp. 62-74.

Uchida, Masahiko, "Full-fledged Take-off of Oracle Applications", Network Computing, February issue, 1998, Ric Telecom Ltd., Feb. 1, 1998, vol. 10, Issue No. 2, pp. 24-30.

English-language machine translation of JP 06-119362.

English-language machine translation of JP 10-171908.

English-language machine translation of JP 11-338936.

Office Action dated Dec. 5, 2011 in JP Application No. 2000-382991 with English-language translation.

English-language machine translation of JP 10-091694.

* cited by examiner

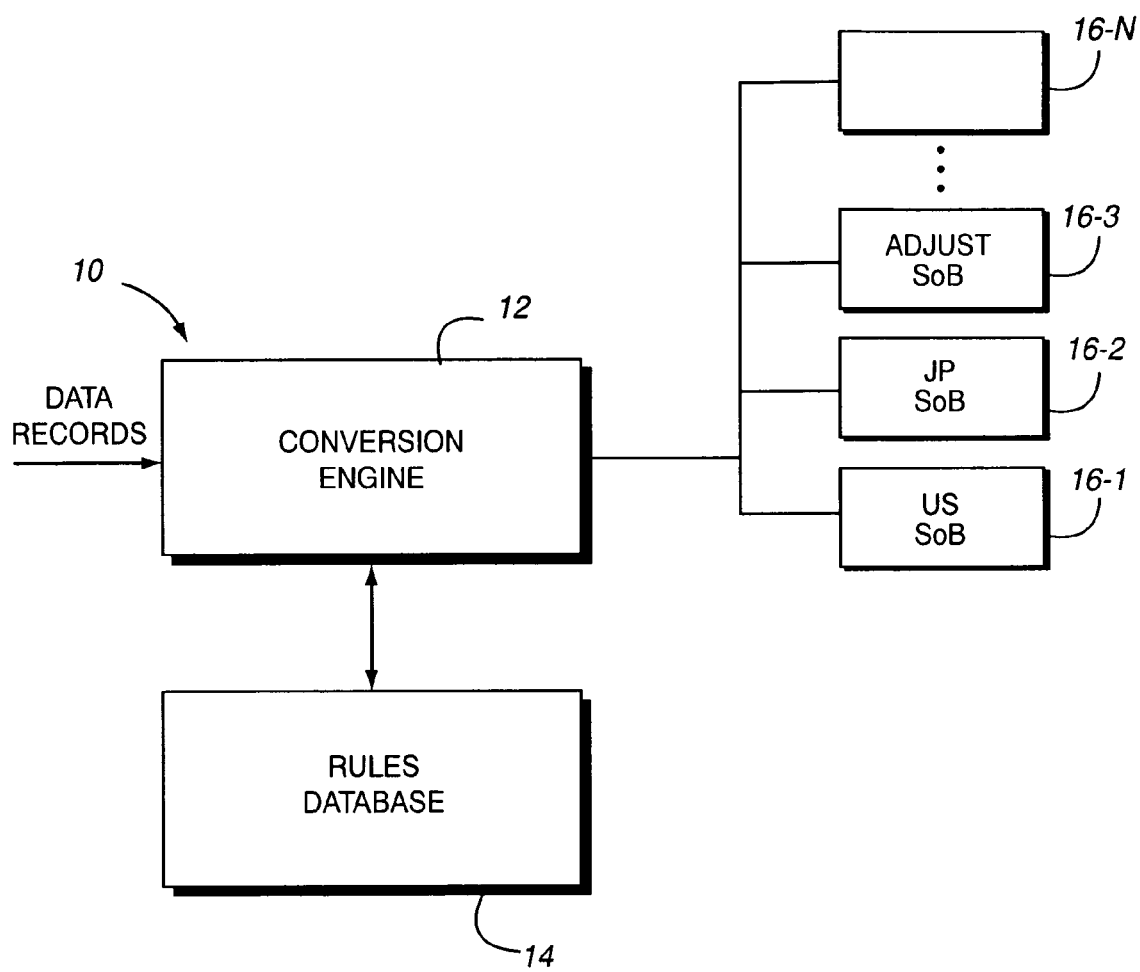

LS2 Fields

*LS2 Code Tables*

Customer_ID(15)-
CUS_XID_CUST_ID

| | | | | H | H | H | H | H | H | - | - | - | - | - |
|---|---|---|---|---|---|---|---|---|---|---|---|---|---|---|

Entity Text Code (6) - GLE_TXT_ENTITY_CDE

| | | | | A | A |
|---|---|---|---|---|---|

Expense Code (6) - GLE_CDE_EXPENSE

| C | C | C | D | D | D |
|---|---|---|---|---|---|

Account Number (15)-GLE_CDE_GL_ACCOUNT

| | | | | | E | E | E | E | E | E | E | E | E | E |
|---|---|---|---|---|---|---|---|---|---|---|---|---|---|---|

Risk Type (6)-PRR_CDE_RISK_TYPE

| G | G | G | G | G | G |
|---|---|---|---|---|---|

Portfolio Type (5)-GLE_CDE_PORTFOLIO

| L | L | L | L | L |
|---|---|---|---|---|

Security ID (8) - GLE_RID_OUTSTANDING

| | | | | J | J | J | J |
|---|---|---|---|---|---|---|---|

Oracle GL Fields

*Accounting FlexField*

IBF/DBF Identifier (2)

| | |
|---|---|

Booking Branch (4)

| | | | |
|---|---|---|---|

GL ACCOUNT (6)

| | | | | X | X |
|---|---|---|---|---|---|

Department (3)

| D | D | D |
|---|---|---|

Descriptive FlexField

Product Code (6)

| G | G | G | G | G | G |
|---|---|---|---|---|---|

Portfolio Code (5)

| L | L | L | L | L |
|---|---|---|---|---|

Customer Number (6)

| H | H | H | H | H | H |
|---|---|---|---|---|---|

Transaction Reference (8)

| | | | | J | J | J | J |
|---|---|---|---|---|---|---|---|

VAT Identifier (1)

| K |
|---|

*Fig. 2C*

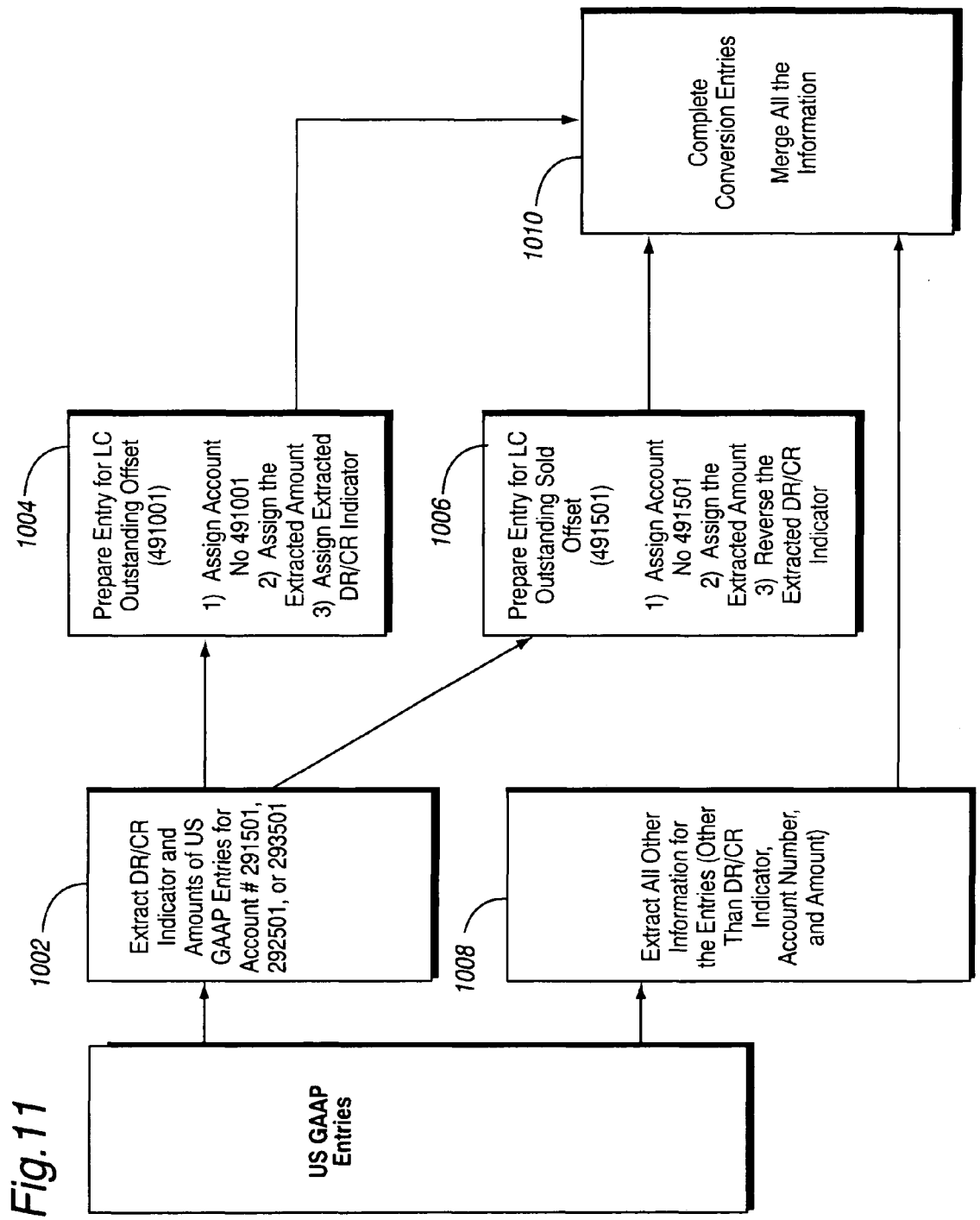

CONVERSION ENGINE AND FINANCIAL REPORTING SYSTEM USING THE CONVERSION ENGINE

RELATED APPLICATION

This application is a division of application Ser. No. 10/371,181, filed Feb. 24, 2003 now U.S. Pat. No. 7,565,311, which is a continuation of application Ser. No. 10/177,764, filed Jun. 24, 2002 now abandoned which is a continuation of application Ser. No. 09/976,289, filed Oct. 15, 2001 now abandoned, which is a continuation of application Ser. No. 09/775,801, filed Feb. 5, 2001 now abandoned, which is a continuation of application Ser. No. 09/563,913, filed May 4, 2000 now abandoned, which claims the benefit of provisional Application No. 60/171,097, filed Dec. 16, 1999.

TECHNICAL FIELD

The present invention generally relates to a financial reporting system and method and, more particularly, to a financial reporting system and method that generates financial statements for different reporting standards.

BACKGROUND AND SUMMARY OF THE INVENTION

A financial reporting system for a business is generally composed of different applications. In the case of a bank, these applications may include a general ledger application and a loan-processing application. These applications generate financial statements that are in accordance with relevant generally accepted accounting principals (GAAP). GAAP refers to the set of rules, convention, standards, and procedures for reporting financial information. US GAAP, for example, are established by the Financial Accounting Standards Board (FASB). Differences generally exist between the GAAP of different countries. In view of the multinational environment in which many businesses operate, it would be desirable to provide a financial reporting system and method that accommodates differences between the GAAP of different countries.

In accordance with one aspect of the present invention, a management system includes a computer-implemented routine for accessing journal entries stored in a computer-readable memory and a computer-implemented journal entry generating routine for automatically generating journal entries for a first set-of-books and for a second set-of-books based on the accessed journal entries. The journal entries for the first set-of-books are in accordance with a first reporting standard and the journal entries for the second set-of-books are in accordance with a second, different reporting standard.

The management system and method described herein provides a single workflow that may be applied to converting a book of original entries in one accounting system to another reporting book in a different accounting system. The system and method allow a user, for example, to set up the accounting method of various items according to any country's GAAP. By way of example, the management system and method described herein provide an automated conversion engine for loan transactions. The conversion engine processes transactions from a lending application and applies a series of rules that automatically generates journal entries that accommodate the differences between US GAAP and Japanese (JP) GAAP. For example, under US GAAP, non-refundable fees associated with a term loan agreement are deferred and amortized over the life of the loan. Under JP GAAP, such fees are treated as immediate income. When a transaction for an up-front fee payment is entered into a commercial lending application for US GAAP, the commercial lending application generates the entries to defer the fee and amortize it. When the conversion engine of the present invention detects these transactions, it reverses the deferral and treats the fee as income for JP GAAP. The conversion engine also reverses any subsequent amortization because the fee has already been recognized.

The conversion engine is configured to perform similar conversions based on other differences between the US and JP GAAP.

The accompanying drawings, which are incorporated in and constitute a part of the specification, illustrate various features of the present invention and, together with the general description given above and the detailed description provided below, serve to explain the principles of the invention.

BRIEF DESCRIPTION OF THE DRAWINGS

FIG. 1 is a simplified block diagram of a conversion system 10 in accordance with the present invention.

FIG. 2C illustrates accounting and descriptive Flexfields.

FIG. 11 is a flowchart illustrating preparation of a Conversion journal entry for SBLC sold.

DETAILED DESCRIPTION

Figure 2A:
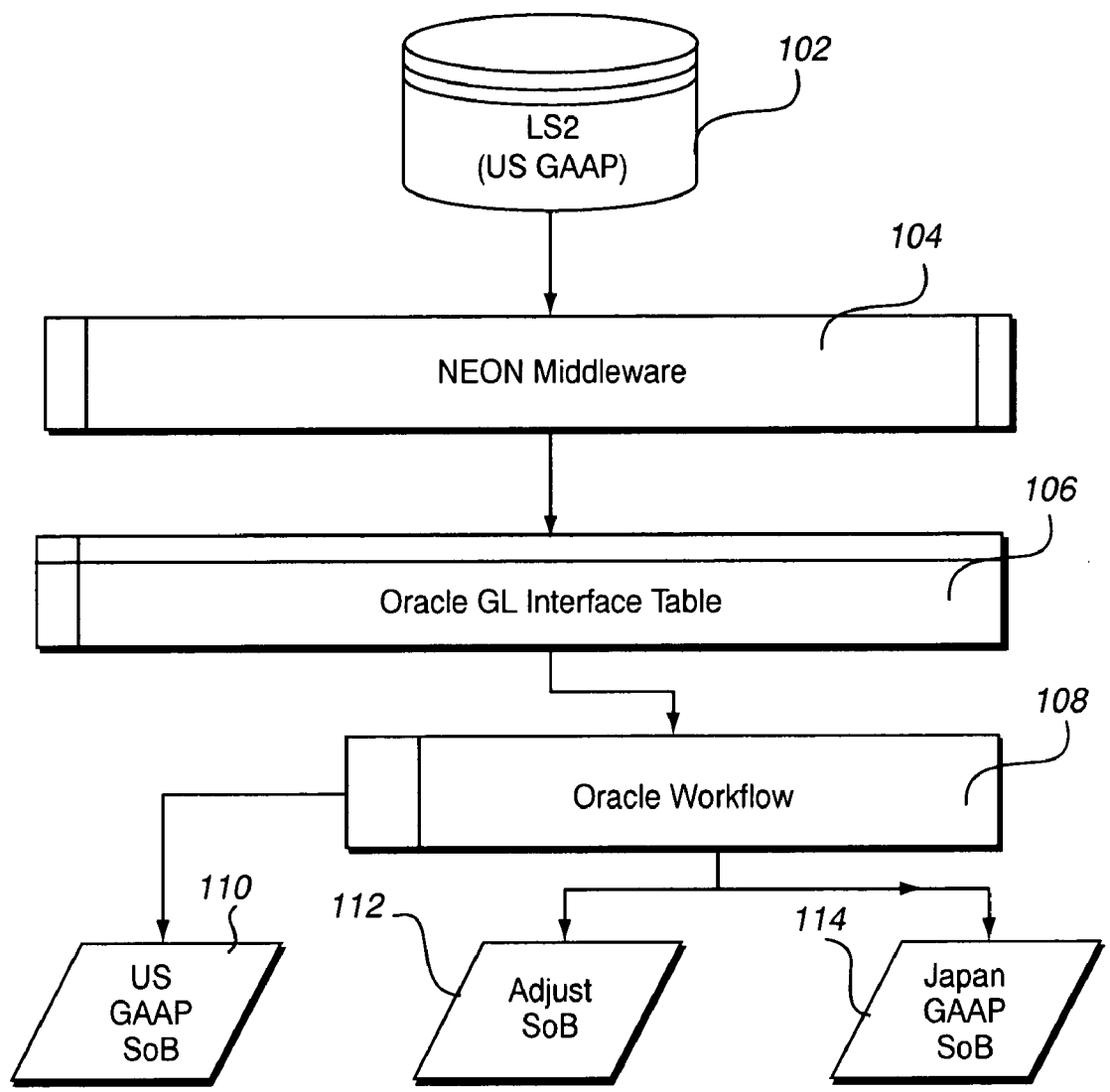
FIG. 2A shows the general architecture of the financial reporting system 100 using a conversion engine in accordance with an embodiment of the present invention.

FIG. 1 is a simplified block diagram of a conversion system 10 in accordance with the present invention. Conversion system 10 includes a conversion engine 12 that is supplied with data records. These data records may be of various types including, but not limited to, records from a commercial lending system, a deposit system, a treasury system, a trade finance system, an accounts payable system, an inventory system, or an accounts receivable system. Each of these records comprises one or more fields that together constitute the record. For example, in the case of a record from a commercial lending system, the fields may include one or more fields for specifying information about banking facility from which the record originated (e.g., facility type identifier (national, international), branch identifier, department identifier, etc.), one or more fields for specifying information about the customer associated with the record (e.g., customer_identifier), and one or more fields specifying the nature of the transaction (loan, standby letter of credit, etc.).

Conversion engine 12 selectively processes these data records in accordance with rules contained in a rules database 14. The processing is selective in the sense that conversion engine examines a certain one or more of the fields in the data record to determine whether a rule for "converting" the data record exists in rules database 14. The rules in rules database 14 are used to "convert" the data records to take into account different treatments of the data contained in the data records by different regulatory authorities, different taxing authorities, different statutory accounting requirements, different generally accepted accounting principles, and the like.

For example, under US GAAP, non-refundable fees associated with a term loan agreement are deferred and amortized over the life of the loan. Under JP GAAP, such fees are treated as immediate income. A commercial lending application used by a US-based financial institution typically generates a data record for such a loan agreement in which the non-refundable fees are deferred and amortized. A data record for an up-front fee payment is supplied to conversion engine 12. This data record in which the non-refundable fees are deferred and amortized is sent to a US Set of Books (SoB) 16-1 via conversion engine 12. Conversion engine 12 replicates this data record for a JP SoB 16-2 and determines whether any rules in rules database 14 are applicable to the data record. In this case, as mentioned above, under JP GAAP, a non-refundable fee associated with a term loan agreement is treated as immediate income. Thus, a rule exists in rules database 14 for reversing the deferral reflected in the corresponding data record in US SoB 16-1 so that the fee is treated as income for purposes of JP GAAP. Conversion engine 12 also reverses any subsequent amortization because the fee has already been recognized. Thus, the data record written to JP SoB 16-2 is in accordance with JP GAAP.

Conversion engine 12 may also be configured to generate data records for an Adjustment SoB 16-3 that reflect the adjustments made by conversion engine 12. Adjustment SoB 16-3 is used to retain an audit trail and to summarize the cumulative adjustments for subsequent review by controllers, auditors, examiners, etc. Together US SoB 16-1, JP SoB 16-2, and adjustment SoB 16-3 serve as the basis for financial reporting.

Conversion engine 12 may be used without limitation to generate data records for other SoBs as suggested in FIG. 1.

As mentioned above, conversion system 10 may be used in connection with a commercial lending system, a deposit system, a treasury system, a trade finance system, an accounts payable system, an inventory system, or an accounts receivable system. In what follows, a detailed description is provided of a conversion engine used in connection with a commercial lending system. This detailed description is provided by way of illustration, not limitation.

The conversion engine described below is typically provided as one component of a management system for a particular business such as a bank. This management system may include various commercially available software applications and the conversion engine described herein interfaces with (perhaps using "middleware"), and uses data generated and output by, these other applications. The description below is given with reference to certain software applications for performing certain functions (e.g., commercial lending, general ledger). These software applications are identified by way of illustration, not limitation. Thus, those of ordinary skill in the art will recognize that the conversion engine of the present invention may be effectively utilized with many different software applications that together make up a management system for a particular business.

In particular, the conversion engine described herein is utilized with a commercial lending application known as LS2™ ("LS2"), also known as Loan 1Q™ or L1Q™, that was jointly developed by International Business Machines and Bankers Trust; a general ledger application known as Oracle General Ledger™ ("Oracle GL"); and a middleware application MQSI from Neon. The general architecture of a management system 100 including a conversion engine in accordance with an embodiment of the present invention is described with reference to FIG. 2A. A commercially available commercial lending application 102 (such as the above-mentioned LS2 commercial lending application) generates journal entries based on the transactions initiated by its users. Commercial lending application 102 may have its own chart of accounts and populates the journal entries to a table such as an Oracle GL-Out Table. For US-based institutions, these journal entries will typically conform to US GAAP. The journal entries, accumulated in detail by account, transaction and customer in the table, are sent through a middleware application 106 (such as the above-mentioned NEON MQSI software) to an interface table 108 of a general ledger application (such as the above-mentioned Oracle GL software). In the particular case of using the LS2 commercial lending application and the Oracle GL general ledger software, for example, there is no conversion of the data in the journal entries by middleware application 106 other than perhaps converting from LS2 GL account to Oracle GL account numbers.

Each journal entry has an Accounting Flex Field (AFF) and a Descriptive Flex Field (DFF). In one particular implementation, the AFF is made up of a combination of a Branch (Facility) Number, a Department identifier, a GL Account Number, and a Control Branch Number. Every journal entry has an AFF composed of these elements. The DFF is context-sensitive, i.e., the elements thereof depend on the type of journal entry. While every journal entry has a descriptive flex field, the elements thereof vary based on the type of journal entry. Examples of elements that may be included in the DFF for a particular type of journal entry include Risk Type, Customer Number, Security IDs, Product and Portfolio. As will be explained below, Portfolio plays a role in the conversion processing.

When the batch entry of journal entries into interface table 106 is complete, an automatic import procedure imports the journal entries into US SoB 110. The imported journal entries may be grouped together using a journal entry header. The journal entries under a journal entry header share a common Business Transaction Code, Accounting (Effective Date), Currency and Risk Type. Upon the successful creation of a journal entry header in the US SoB 110, the entry is replicated from US SoB 110 to JP SoB 114. Conversion engine 108 then does an analysis based on, for example, the Business Transaction Code and/or Portfolio, to determine if any rules affect the replicated entry.

Conversion engine 108 is provided with the following logic functionality:

1. Selective Conversion—Conversion engine 108 is configured to sift through journal entries and select those that are affected by the business rules to be described below based on criteria such as risk type, portfolio type and/or account. "Selective conversion" as used herein includes the capability to effect adjustments to only part of a journal entry.

2. Minimum/Maximum Logic—Conversion engine 108 is provided with logic to determine the minimum or maximum value of an array. This logic is employed for calculating the gain or loss on the sale of loans with premiums or discounts.

3. Cross-Referencing—Conversion engine 108 is configured to reference tables outside the conversion program to look up values. This is employed for determining general ledger accounts that may have been changed to the recalculation of a gain or loss due to GAAP differences.

As mentioned above, after the US GAAP-based journal entries are replicated in JP SoB 114, conversion engine 108 determines whether any rules in a rules database associated with conversion engine 108 are applicable to the replicated journal entries. In one implementation, these rules are organized into two database tables: an exclusion rules table and a reclassification rules table. The exclusion rules in the exclusion rule table reverse journal entries or exclude them from the target set of books and the reclassification rules in the reclassification rules table change or substitute items in the AFF (e.g., the GL Account). If there are rules in the rules database applicable to the replicated journal entries, conversion engine 108 applies these rules so that the journal entries in JP SoB 114 are in accordance with JP GAAP. Conversion engine 108 also makes appropriate journal entries to an adjustment SoB 112. Adjustment SoB 112 is used to retain an audit trail and to summarize the cumulative adjustments for subsequent review by controllers, auditors, examiners, etc. Adjustment SoB 112 is further supported by comprehensive audit trail conversion reports that document the transactions affected by expenses code, portfolio, risk type, transaction reference number, the pre- and post-conversion balances and the purpose of the adjustment (e.g., to reverse the deferral of upfront fees). Together US SoB 110, adjustment SoB 112, JP SoB 114, and the audit trail report serve as the basis for financial reporting.

Certain manual journal entries may be passed to adjustment SoB 112 and JP SoB 114 to accommodate those transactions not covered by the conversion rules in the rules database associated with conversion engine 108. Manual journal entries are implemented by constructing an interface that permits a user to selectively pass entries to a specified SoB.

Thus, conversion engine 108 is a rules-based engine that selectively applies conversion logic and automates the generation of journal entries for a plurality of different SoBs. The conversion engine is a single flow process in that it is operative as a data record is being processed, i.e., whenever conversion engine detects a data record having a particular characteristic, it applies the appropriate rules from the rules database.

Conversion engine 108 may be implemented using Oracle Workflow™. Oracle Workflow permits users to define and automate business processes, each business process consisting of a series of activities and inter-activity dependencies. Oracle Workflow Builder is a tool that permits users to create, view and/or modify a business process with mouse operations. The Oracle Workflow Engine monitors workflow states and coordinates the routing of activities for a process. An "activity" in a process definition can be an automated function defined by a PL/SQL stored procedure, a notification to a user (that may optionally request a response), or a sub-flow that itself decomposes to a more granular set of activities. A workflow process is initiated when an application calls a set of Oracle Workflow Engine APIs (Application Programming Interfaces). The Oracle Workflow Engine divides the relevant work item defined by the application, through a specific workflow process definition. According to the workflow process definition, the Workflow Engine performs automated steps and invokes appropriate agents when external processing is required. The detailed description below will enable those skilled in the art to generate (e.g., using Oracle Workflow Builder) business processes for implementing a conversion engine in accordance with the present invention.

The LS2 commercial lending application may run on an IBM 3272.

Oracle Financial Statement Generator™ is a report-writing tool that allows users to develop various reports without programming. This tool may sit on an Oracle database—(e.g., Version 8.05) running on an IBM RS600/SP with an AIX operating system. This tool can be used, for example, to present financial information by reclassifying and grouping applicable accounts and is usable to handle GAAP conversion items that do not require computation, such as the presentation of certain balance-sheet items.

Finally, NEON™ MQSI software may be used as a middleware tool to provide a data interface between various applications. The NEON software may sit on an Oracle database (e.g., Version 8.05) running on an IBM RS6000/SP with an AIX operating system. For purposes of the GAAP conversion, this middleware ensures the completeness of data necessary for conversion and translates certain LS2-specific data values to Oracle GL values. The middleware application comprises an important part of data reconciliation during daily data posting and GAAP conversion processes. The objective of reconciliation using the middleware tool is two-fold: (1) LS2-to-US GAAP, which requires no data manipulation (the primary purpose is to ascertain the completeness and accuracy of data), and (2) LS2-to-JP GAAP, which executes the applicable conversion procedures.

Figure 2B:
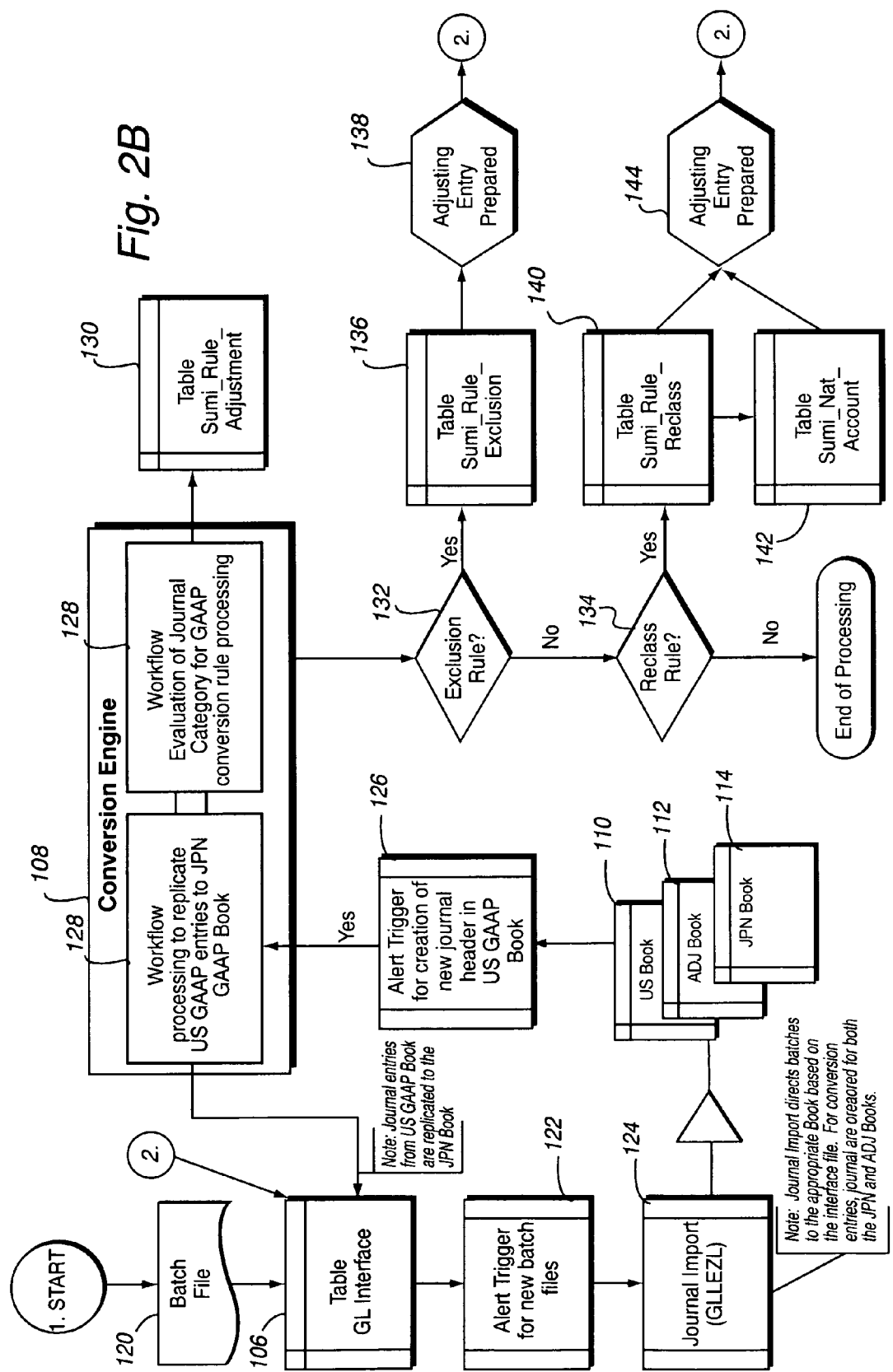
FIG. 2B is a flow chart for the conversion engine.

FIG. 2B illustrates a system flow chart for conversion engine 108. A batch file 120 of accumulated journal entries is sent through middleware application 104 (see FIG. 2A) to interface table 106 of a general ledger application (such as the Oracle GL software). Within Oracle GL, an event alert is triggered (122) whenever any data with SoB IDS for US or JP is inserted or updated. The trigger invokes a Journal Import routine 124 that directs batches to the appropriate SoB (i.e., US SoB 110, Adjustment SoB 112 or JP SoB 114) based on the data in interface table 106. This program imports journals and batches based on relevant arguments into the GL_INTERFACE table for the appropriate SoB.

If a new journal header is created in the US SoB 110, an alert is triggered at 126. This alert triggers a PL/SQL package that constitutes conversion engine 108 and results in processing (128) that replicates entries in US SoB 110 for JP SoB 114.

The Oracle tables used in conversion engine 108 are:

GL_INTERFACES—This table is an interface table to Oracle GL, loaded with different data, i.e., different SoBs, Debit and Credit amounts, GL accounts, specific journal entry line information and source.

GL_JE_BATCHES
GL_JE_HEADERS
GL_JE_LINES
GL_JE_CATEGORIES
GL_JE_SOURCES

GL_JE_BATCHES, GL_JE_HEADERS, GL_JE_LINES, GL_JE_CATEGORIES, and GL_JE_SOURCES are used to get the batch/header/line/source/category details of the batch.

Conversion engine 108 then evaluates (128) whether the replicated entries are treated differently under US and JP GAAP by reference to a custom table 130 (SUMI_RULE_ADJUSTMENTS). Table 130 stores adjustment names, rule type and other segment values. Conversion engine 108 uses the data in this table to check whether the journal entry category is treated differently under US and JP GAAP. If the journal entry category exists in table 130, there is a different treatment between US GAAP and JP GAAP. Conversion engine 108 determines whether this different treatment is based on an exclusion rule at 132 or a reclassification rule at 134 and prepares the appropriate conversion entry.

SUMI_RULE_EXCLUSIONS table 136 contains those journal entry categories that are excluded or need to be reversed under JP GAAP. This table stores the exclusion rule numbers, the exclusion rules names and the exclusion flags. Using the data in table 136, the replicated journal entry in JP SoB 114 is adjusted at 138 for JP GAAP and an appropriate journal entry is made in Adjustment SoB 112.

SUMI_RULE_RECLASS table 140 contains those journal entry categories that require a reclassification between GL accounts. This table contains the rule numbers, reclassification codes, reversal flags, and other segments. Table 140 also contains flags for adjustments to be omitted based on a journal entry category using an exclusion flag. This table is used with a table 142 called SUMI_NAT_ACCT. SUMI_NAT_ACCT table 142 is used in conjunction with SUMI_RULE_RE-CLASS table 140 and contains accounts to be substituted by the reclass rule. The table contains the 'source' Natural Account Segment and the 'target' (adjustment) Natural Account Segment, HO CODE segment, and BRANCH CODE segments.

If the journal entry category of the replicated journal entry exists in SUMI_RULE_RECLASS, there is a different treatment in US and JP GAAP. If the journal entry category is found, conversion engine 108 evaluates the SUMI_NAT_ACCT table 142 for the corresponding adjustment account and an adjustment is made at 144. Together, these tables are used to re-map the GL accounts used in the original entry into a different account in JP SoB 114.

The packages used are WF_ENGINE, WF_CORE, FND_GLOBAL, and FND_REQUEST. WF_ENGINE uses the WF_ENGINE, Get_Item_Attribute_Number to get the relevant Batch attributes of the batch being processed and other procedures in the package to get the Batch properties. WF_CORE is used for context details, FND_GLOBAL is used to initialize the import program parameters, and FND_REQUEST is used to submit the import program from the operating system (OS) level.

The charts of accounts of Oracle GL are comprised of two components: account captions (horizontal) and key segments (vertical). These key segments in Oracle's applications are referred to as "FlexFields". As mentioned above, there are two types of FlexFields: Accounting (required) and Descriptive (optional). Defining the format of the FlexFields before implementation is a minimum requirement. Since neither Accounting nor Descriptive FlexFields are generally easily modifiable after implementation, it is very important to design them with sufficient care and consideration for future needs. Identification of each of the Accounting and Descriptive FlexFields follow with reference to FIG. 1C. Unless otherwise specified, all fields are alphanumeric. Any relationships suggested in FIG. 1C are by way of example, not limitation.

Accounting FlexField

A. IBF/DBF Facility

In the US, this field serves to specify the domestic or international banking facility. The default value specifies domestic. In other countries, the segment may be reserved to denote different market jurisdictions under the applicable requirements. A predetermined character string (e.g. 00) may be used to indicate N/A (not applicable).

B. Department

This is also known as the cost/profit center code. Each lower-level department has a department code assigned. The first character denotes a department group and the remaining two characters denote a unique department code.

C. GL Account

D. Control Branch

This field describes the branch claiming the ownership of a balance or transaction recorded in Oracle GL.

Descriptive FlexField

E. Product Code

This field is useful for GAAP conversion purposes and producing reports such as profitability. Accounts are grouped by product type and a value is assigned for each of the accounts.

F. Portfolio Code

This field, like the Product Code, is used for GAAP conversion purposes and for producing reports such as profitability.

G. Customer Number

H. Transaction Reference Number

I. VAT Identifier

This field is useful to provide value-added tax computation requirements in a VAT jurisdiction.

LS2

J. Customer ID

K. Entity Text Code

L. Expense Code

M. Account Number

N. Risk Type

O. Portfolio Type

P. Security ID

In addition to the above fields, the following data component in the LS2 GL Entry Table is used by conversion engine 108:

GLE_CDE_BUS_TRAN—Business transaction associated with the transaction.

This field is placed in the Category ID field of the Oracle GL's Journal Import Table.

Figure 3:
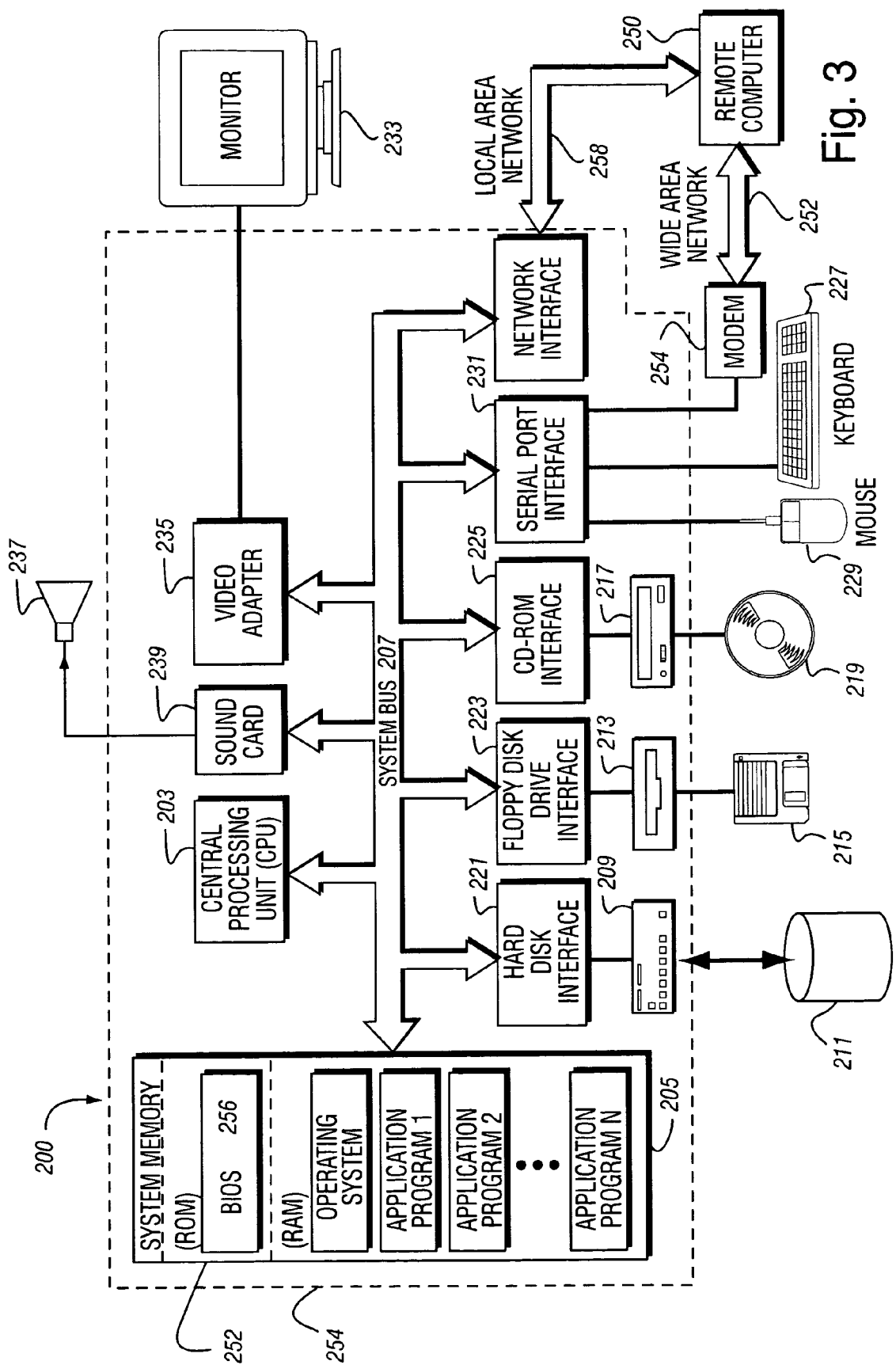
FIG. 3 illustrates a computer system 200 suitable for implementing a conversion engine in accordance with an embodiment of the present invention.

Stored PL/SQL-based procedures provide the framework of conversion engine 108 for performing the above-described conversions. These stored procedures may be implemented in any suitable computing environment such as an environment that runs Oracle® Workflow™. FIG. 3 illustrates a computer system 200 suitable for use in connection with the conversion engine. Computer system 200 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 207 includes read only memory (ROM) 252 and random access memory (RAM) 254. A basic input/output system (BIOS) 256, containing the basic routines that help to transfer information between elements within personal computer system 200, such as during start-up, is stored in the ROM 252. Computer system 200 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 200. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or the ROM 252 and/or the RAM 254 of system memory 205. Such program modules may include an operating system providing graphics and sound APIs, one or more application programs, other program modules, and program data. A user may enter commands and information into computer system 200 through input devices such as a keyboard 227 and pointing device 229. Other input devices may include a microphone, joystick, game controller, satellite dish, scanner, or the like. These and other input devices are often connected to processing unit 203 through a serial port interface 231 that is coupled to system bus 207, but may be connected by other interfaces, such as a parallel port interface or a universal serial bus (USB). A monitor 233 or other type of display device is also connected to system bus 207 via an interface, such as a video adapter 235.

Computer system 200 may also include a modem 254 or other means for establishing communications over wide area network 252, such as the Internet. Modem 254, which may be internal or external, is connected to system bus 207 via serial port interface 231. A network interface 256 may also be provided for allowing computer system 200 to communicate with a remote computing device 250 via a local area network 258 (or such communication may be via wide area network 252 or other communications path such as dial-up or other communications means). Computer system 200 will typically include other peripheral output devices, such as printers and other standard peripheral devices.

GAAP conversions may be viewed as being of one of three different types: a first type involving reclassifications; a second type involving more complex conversion calculations; and a third type involving manual adjustment of journal entries. With reference to the software applications mentioned above, the first type of GAAP conversion may be implemented using Oracle Financial Statement Generator and the second type of GAAP conversion may be implemented using Oracle Alert and Oracle Workflow. Manual adjustment may be utilized in those cases where neither Oracle Financial Statement Generator nor Oracle Workflow and Oracle Alert are practical due to the complexity, materiality or frequency of the transaction. In such cases, the cost of building automated procedures may significantly exceed the expected benefits.

The following table summarizes each type, respective descriptions, and exemplary transactions for each proposed approach:

| TRANSACTIONS | APPROACH | DESCRIPTIONS |
| --- | --- | --- |
| Ordinary standby letters of credit or guarantees Loan principals (e.g., on notes or certificates for Japanese GAAP) Premium or discount on loans issued Allowance for loan losses | Financial Statement Generator ™ | Oracle Financial Statement Generator report writing and flexible presentation capabilities would be sufficient to handle balance-sheet reclassifications and income-statement adjustments that do not affect revenue recognition. No significant computation is executed using Oracle Financial Statement Generator. Data manipulation is implicit and does not affect the physical structure of sets of books. |
| Certain loan-related fees (e.g., commitment, syndication fees) Loans held for sale or trading Standby letters of credit or guarantees sold Foreign exchange re-evaluation | Oracle Alert ™ and Workflow ™ | Oracle Alert's PL/SQL customized capabilities to execute more complex routines to handle GAAP conversion items that require more than reclassifications. Oracle Workflow would facilitate creating entries and postings to sets of books within Oracle General Ledger. |
| Non-performing loans Other GAAP adjustments (revaluation of instruments) | Manual Adjustment | Neither Oracle Financial Analyzer nor Oracle Workflow is practical to handle these GAAP conversion items due to the complexity, materiality, or frequency of the transaction. The costs to build automated procedures may significantly exceed the expected benefits. |

A more detailed explanation of these illustrative loan processing application transactions and approaches is provided below.

I. Upfront Loan Fees

US GAAP

Statement of Financial Accounting Standards No. 91, *Accounting for Nonrefundable Fees and Costs Associated with Originating or Acquiring Loans and Initial Direct Costs of Loans* ("SFAS No. 91"), establishes the accounting for nonrefundable fees and costs associated with lending, committing to lend, or purchasing a loan or group of loans. Such nonrefundable (upfront) loan fees, including commitment fees and syndication fees, among others, should be deferred and recognized over the contractual life of the loan or facility as interest or fee income. Whereas the interest method is the preferred method under SFAS No. 91, the straight-line method is also appropriate because of immateriality.

JP GAAP

Upfront loan fees are recognized as fee income when related services are provided (normally when received). No deferral or amortization of these fees as an adjustment of yield is recorded.

There are two types of fees-related transactions that affect the GAAP conversion approach: loans originated or purchased at (1) par or (2) discount or premium. For purposes of loan processing GAAP conversion, only type (1) loans (issued at par) are subject to adjustment. Accounting for amortization of discount or premium on loans is substantially the same under both US GAAP and JP GAAP and requires no further computation or reclassification.

A code may be used to differentiate loans issued at par from those at discounts or premiums. For example, if the LS2 loan processing application is used, the "Portfolio Code" may be used for differentiation. "LOANPAR" may be used for loans issued at par, "DISCPREM" for loans issued at a discount or premium.

A1. Issue 1

The LS2 commercial lending application computes amortization of upfront loan fees based on the straight-line method.

A2. Solution/Conversion 1

The straight-line method is used as the amortization method because the difference from the interest rate method is immaterial.

B1. Issue 2

The LS2 commercial lending application allows its users to defer and amortize upfront fees as an adjustment to yield or fee income in accordance with FASB Statement No. 91. Therefore, for JP GAAP reporting purposes, the deferral and amortization should be reversed and adjusted to fee income when received.

In addition, the LS2 commercial lending application defers and amortizes as income the "price difference" of the loan (the difference between principal amount and actual price for the loan origination or purchase) as position discount or position premium together with deferred upfront fee income. This accounting treatment is consistent with US GAAP. Even under JP GAAP, the price difference should be deferred and amortized as interest over the life of the loan.

Under the normal practices, the relationship of upfront fees and the loan origination and purchase price are as follows:

(1) Regular Loan Origination
Upfront Fee=Will be paid
Origination Price=at Par
(2) Regular Loan Purchase
Upfront Fee=Will be paid
Purchase Price=at Par
(3) Distressed Loan
Upfront Fee=Will not be paid
Purchase Price=at Discount
(4) Private Placement Bond
Upfront Fee=Will not be paid
Purchase Price=at Discount or Premium In cases (1) and (2), Position Discount or Premium Position account calculated by the LS2 commercial lending application represents "Upfront Fees" that should be recognized as income immediately under JP GAAP. On the other hand, in cases (3) and (4), Position Discount or Position Premium account calculated by the LS2 commercial lending application represents the price difference that should be deferred and amortized as income under JP GAAP as well as US GAAP.

B2. Solution/Conversion 2

Journal Entry Conversion Summary

Loan transactions are categorized into first and second transaction types. These two transaction types are created as two different "Portfolios" in the LS2 commercial lending application and a user selects one or the other based on transaction information. In Oracle GL Interface Table 106, the "Portfolio" of the LS2 commercial lending application is captured as "Portfolio Type" in the Descriptive Flexfield. The first transaction type is Loans Originated/Purchased at Par= (Regular Loan Origination and Regular Loan Purchase) =Portfolio Code "LOANPAR". The second transaction type is Loans Purchased at Discount or Premium=(Distressed Loan and Private Placement Bond)=Portfolio Code "DISCPREM". The accounting for the second transaction type (portfolio) is consistent under JP and US GAAP. Therefore, if conversion engine 108 receives US GAAP journal entries related to the second transaction type, no journal entries are made to Adjustment SoB 112 and the US GAAP journal entries are submitted to JP SoB 114 as proper JP GAAP journal entries.

However, the position discount and position premium (including Fees Held Awaiting Disposition and Unfunded Discount) of the first transaction type (portfolio) represents deferred upfront fee that should be credited to income when received under JP GAAP. Accordingly, if conversion engine 108 receives US GAAP journal entries related to the first transaction type, conversion engine 108 generates journal entries for Adjustment SoB 112. Conversion engine 108 combines US GAAP journal entries and GAAP adjustment journal entries to produce proper JP GAAP journal entries.

More specifically, US GAAP journal entries generated by the LS2 commercial lending application are submitted to conversion engine 108 together with "Business Transaction Code" and "Portfolio" through Oracle GL Interface Table 106. If conversion engine 108 receives journal entries for Portfolio Code "Loan Originated/Purchased at Par (LOANPAR)", it prepares the following GAAP Conversion journal entries for the following "Business Transaction Code" to convert US GAAP journal entries to JP GAAP journal entries:

1. Receipt of Upfront Loan Fee (Business Transaction Code=UFFBR, CPSDC)

The US GAAP journal entry of the LS2 commercial lending application temporarily records an upfront loan fee received for facility in syndication as a "Fee Held Awaiting Disposition (FHAD)" until syndication is completion. For JP GAAP reporting purposes, upfront loan fees are credited to fee income account "Upfront Loan Fee Income" when received.

a) Conversion Journal Entries

Conversion engine 108 prepares Conversion journal entries for Adjustment SoB 112 to credit the amount of the received upfront fee to "Upfront Loan Fee Income" and debit the amount to "Fee Held Awaiting Disposition (FHAD)" on the date of receipt. Separate "Upfront Fee Income" accounts are created for Loan on Note, Loan Certificate and Other Product, respectively. This journal entry is prepared by the "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. Even if reversal entries related to this business event for correction of error or cancellation are received, GAAP conversion can be processed by the same logic and conversion engine.

2. Distribution to Participating Lender (Paid to Borrower/Seller) (Business Transaction Code=EFPFH, CPSDC)

The US GAAP journal entry of the LS2 commercial lending application debits the amount distributed to a participating lender (or paid to borrower/seller) to "Fee Held Awaiting Disposition (FHAD)". For JP GAAP reporting purposes, the amount paid is debited to the fee income account "Upfront Loan Fee Income" when paid.

a) Conversion Journal Entries

Conversion engine 108 prepares Conversion journal entries for Adjustment SoB 112 to debit the upfront fee distributed to a participating lender to "Upfront Loan Fee Income" and credit the amount to "Fee Held Awaiting Disposition (FHAD)" on the date of payment. As well as receipt of upfront fee, proper "Upfront Fee Income Account" should be used based on type of loan (loan on note, certificate and other). This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. Even if reversal entries related to this business event for correction of error or cancellation are received, GAAP conversion can be processed by the same logic and conversion engine.

3. Discount Set Up (Deferral of Upfront Loan Fee) (Business Transaction Code=BKRMD)

When the syndication is closed, the host bank's share of upfront fee is determined and transferred to position discount (premium) accounts, i.e. "Position Discount (DISC)", "Position Premium (PRMUM)" or "Unfunded Discount (UNFDS)" by the LS2 commercial lending application. For JP GAAP reporting purposes, the amount is already recognized as income and the transfer entries should be reversed.

a) Conversion Journal Entries

Conversion engine 108 prepares Conversion journal entries for Adjustment SoB 112 to debit the amount of transfer to "Position Discount (DISC)" or "Unfunded Discount (UNFDS)" and credit the amount to "Fee Held Awaiting Disposition (FHAD)". In case of premium position, the amount is credited to "Position Premium (PRMUM)" or "Unfunded Discount (UNFDS)" and debited to "Fee Held Awaiting Disposition (FHAD)". This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. In this case, Conversion journal entries will offset US GAAP journal entries and no journal entries are passed to JP SoB 114. Even if reversal entries related to this business event for correction of error or cancellation are received, GAAP conversion can be processed by the same logic and conversion engine.

4. Syndication Completion (Business Transaction Code=CBUY, CCAN, CSEL)

Under US GAAP, as the syndication is closed, the remainder in "Fee Held Awaiting Disposition (FHAD)" after distribution to participating lender and transfer to discount account is credited to "Syndication Fee (SYNFM)" as fee income. However, for JP GAAP reporting purposes, the upfront loan fee is already recognized as income. Thus, the US GAAP journal entry should be reversed.

a) Conversion Journal Entries

Conversion engine 108 prepares Conversion journal entries for Adjustment SoB 112 to reverse US GAAP entry regarding recognition of the remaining upfront fee in "Fee Held Awaiting Disposition (FHAD)" as "Syndication Fee (SYNFM)" by debiting the amount to "Syndication Fee (SYNFM)" and crediting to "Fee Held Awaiting Disposition (FHAD)". This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. In this case, Conversion journal entries will offset US GAAP journal entries and no journal entries are passed to JP SoB 114. Even if reversal entries related to this business event for correction of error or cancellation are received, GAAP conversion can be processed by the same logic and conversion engine.

5. Amortization of Position Discount and Premium (Business Transaction Code=FAMRT, CDECR)

The LS2 commercial lending application prepares a US GAAP journal entry regarding amortization of discount accounts by debiting calculated amortization amount to "Position Discount (DISC)", Position Premium (PRMUM)" or "Unfunded Discount (UNFDS)" and crediting the amount to "Amort. Commitment Fee Income (ACOMF)" or "Amort. Interest Income—Orig. Fees (AINTI)". For JP GAAP reporting purposes, the fee deferred as discount accounts is already recognized as income and the amortization entries should be reversed.

a) Conversion Journal Entries

Conversion engine 108 prepares the Conversion journal entry for Adjustment SoB 112 to reverse US GAAP journal entries regarding amortization of discount accounts, i.e. debit to "Amort. Commitment Fee Income (ACOMF)" or "Amort. Interest Income—Orig. Fees (AINTI)" and credit to "Position Discount (DISC)" or "Unfunded Discount (UNFDS)". In the case of premium position, the amount is debited to "Position Premium (PRMUM)" or "Unfunded Discount (UNFDS)" and credited to "Amort. Commitment Fee Income (ACOMF)" or "Amort. Interest Income—Orig. Fees (AINTI)". This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. In this case, Conversion journal entries offset US GAAP journal entries and no journal entries are passed to JP SoB 114. Even if reversal entries related to this business event for correction of error or cancellation is received, GAAP conversion can be processed by the same logic and conversion engine.

6. Transfer to Non Accrual Status (Business Transaction Code

=DLTNA, OTNAC)

If the loan becomes non-performing (non-accrual status) loan, "Position Discount" and "Position Premium" are transferred to related non-accrual accounts, i.e. "Position Discount—Non-Accrual" and "Position Premium—Non-Accrual". For JP GAAP purposes the Discount and Premium are already recognized as income. Therefore, conversion engine 108 prepares GAAP Conversion journal entries to reverse the transfer entries.

a) Conversion Journal Entries

Conversion engine 108 prepares the Conversion journal entry for Adjustment SoB 112 to reverse US GAAP journal entries regarding the account transfer by debiting the amount to "Position Discount (DISC)—Non-Accrual" and crediting to "Position Discount (DISC)—Accrual" or debiting to "Position Discount (DISC)—Accrual" and "Position Premium (PRMUM)—Non-Accrual". This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. In this case, Conversion journal entries will offset US GAAP journal entries and no journal entries are passed to JP SoB 114. Even if reversal entries related to this business event for correction of error or cancellation are received, GAAP conversion can be processed by the same logic and conversion engine.

7. Transfer Back to Accrual Status (Business Transaction Code

=DLTAC, OTACC)

If the non performing (non accrual status) loan becomes performing (accrual status), the transfer back from Non-Accrual accounts to Accrual accounts of "Position Discount" and "Position Premium" is made by the LS2 commercial lending application. For JP GAAP purposes, the original transfer entries (from accrual to non accrual) are reversed and therefore, conversion engine 108 prepares Adjustment journal entries to reverse the transfer back entries.

a) Conversion Journal Entries

Conversion engine 108 prepares the Conversion journal entries for Adjustment SoB 112 to reverse US GAAP journal entries by debiting "Position Discount (DISC)—Accrual" and crediting to "Position. Discount (DISC)—Non-Accrual" or debiting to "Position Discount (DISC)—Non Accrual" and "Position Premium (PREM)—Accrual". This journal entry is prepared by "Upfront Fee Conversion Program 3 (Fee Recognition)" to be described below.

b) JP GAAP Journal Entries

Conversion engine 108 prepares JP GAAP journal entries for JP SoB 114 by combining (netting) US GAAP journal entries and Conversion journal entries. In this case, Conversion journal entries offset US GAAP journal entries and no journal entries are passed to JP SoB 114. Even if reversal entries related to this business event for correction of error or cancellation are received, GAAP conversion can be processed by the same logic and conversion engine.

8. Sale of Loan (Business Transaction Code=FSADJ, PLSAD)

When a loan is sold, under US GAAP, unamortized discount/premium accounts are disposed and realized as adjustment to "Gain on Sale (GNOSL)" and "Loss on Sale (LSOSL)". Under JP GAAP, the unamortized amount is already recognized as income when received/paid. Therefore, US GAAP amount of "Gain on Sale (GNOSL)" should be adjusted by the unamortized amount of discount/premium.

a) Conversion Journal Entries

Conversion engine 108 prepares the Conversion journal entries for Adjustment SoB 112 that are necessary to adjust gain and loss on sale by the unamortized amount of discount/premium account at the time of sale. For example the unamortized discount will be debited to "Gain on Sale (GNOSL)" or "Loss on Sale (LSOSL)" and credited to "Position Discount (DISC)" or "Unfunded Discount (UNFDS)". In the case of unamortized premium, the amount is credited to "Gain on Sale (GNOSL)" or "Loss on Sale (LSOSL)" and debited to "Position Premium (PRMUM)" or "Unfunded Discount (UNFDS)". This journal entry is prepared by "Upfront Fee Conversion Program 1 (Sale)" to be described below.

b) JP GAAP Journal Entries

Conversion engine 108 prepares JP GAAP journal entries for JP SoB 114 by combining (netting) US GAAP journal entries and Conversion journal entries. Even if reversal entries related to this business event for correction of error or cancellation are received, GAAP conversion can be processed by the same logic and conversion engine.

9. Charge-Off of Loan (Business Transaction Code=CHOFF)

Under US GAAP, charge-off amount of loan can be applied to "Discount Position (DISC)" and the offset will reduce the amount to be debited to "Loss on Charge-Off (ALLOW)". Also, "Position Discount (PRMUM)" will be charged off as well as principal amount and it will increase "Loss on Charge Off (ALLOW)". However, for JP GAAP reporting purposes, the fee deferred as "Position Discount (DISC)" or "Position Premium (PRMUM)" is already recognized as income (negative income) when received (or paid). Accordingly, the amount of Premium and Discount (including "Unfunded Discount (UNFDS)") should be adjusted to "Loss on Charge Off (ALLOW)" under JP GAAP.

a) Conversion Journal Entries

Conversion engine 108 prepares Conversion journal entries for Adjustment SoB 112 to credit "Discount Position (DISC)" or "Unfunded Discount (UNFDS)" and debit "Loss on Charge-Off (ALLOW)". For premium positions, the entry should be debited to "Position Premium (PRMUM)" or "Unfunded Discount (UNFDS)" and credited to "Loss on Charge-Off (ALLOW)". This journal entry is prepared by "Upfront Fee Conversion Program 2 (Charge-Off)" to be described below.

b) JP GAAP Journal Entries

Conversion engine 108 prepares JP GAAP journal entries for JP SoB 114 by combining (netting) US GAAP journal entries and Conversion journal entries. Even if reversal entries related to this business event for correction of error or cancellation are received, GAAP conversion can be processed by the same logic and conversion engine.

10. Other Transactions

The LS2 commercial lending application also creates upfront fee related journal entries for other loan related transactions. These transactions are adjustments to and transfers between discount position, premium position, unfunded discount and related PL accounts. For JP GAAP purposes, all these entries related to upfront fee should be reversed. Accordingly, for loan related transactions for Business Transaction Codes other than above, US GAAP Journal Entries should be converted to JP GAAP using Program 3 (Fee Recognition). Even if reversal entries related to this business event for correction of error or cancellation are received, GAAP conversion can be processed by the same logic and Conversion Program.

Table I provide sample journal entries (Journal Entries for Upfront Loan Fee).

Other Interface Information

Other interface information for US SoB, e.g. "Date of Creation", "Accounting Date", "Product Code", "Customer Code" etc. is submitted to Adjustment SoB 112 and JP SoB 114 without modification except for "Group ID". The "Group ID" for "US SoB" is "US GAAP". This is replaced with "Conversion" and "JP GAAP" for Adjustment SoB and JP SoB, respectively.

Figure 4:
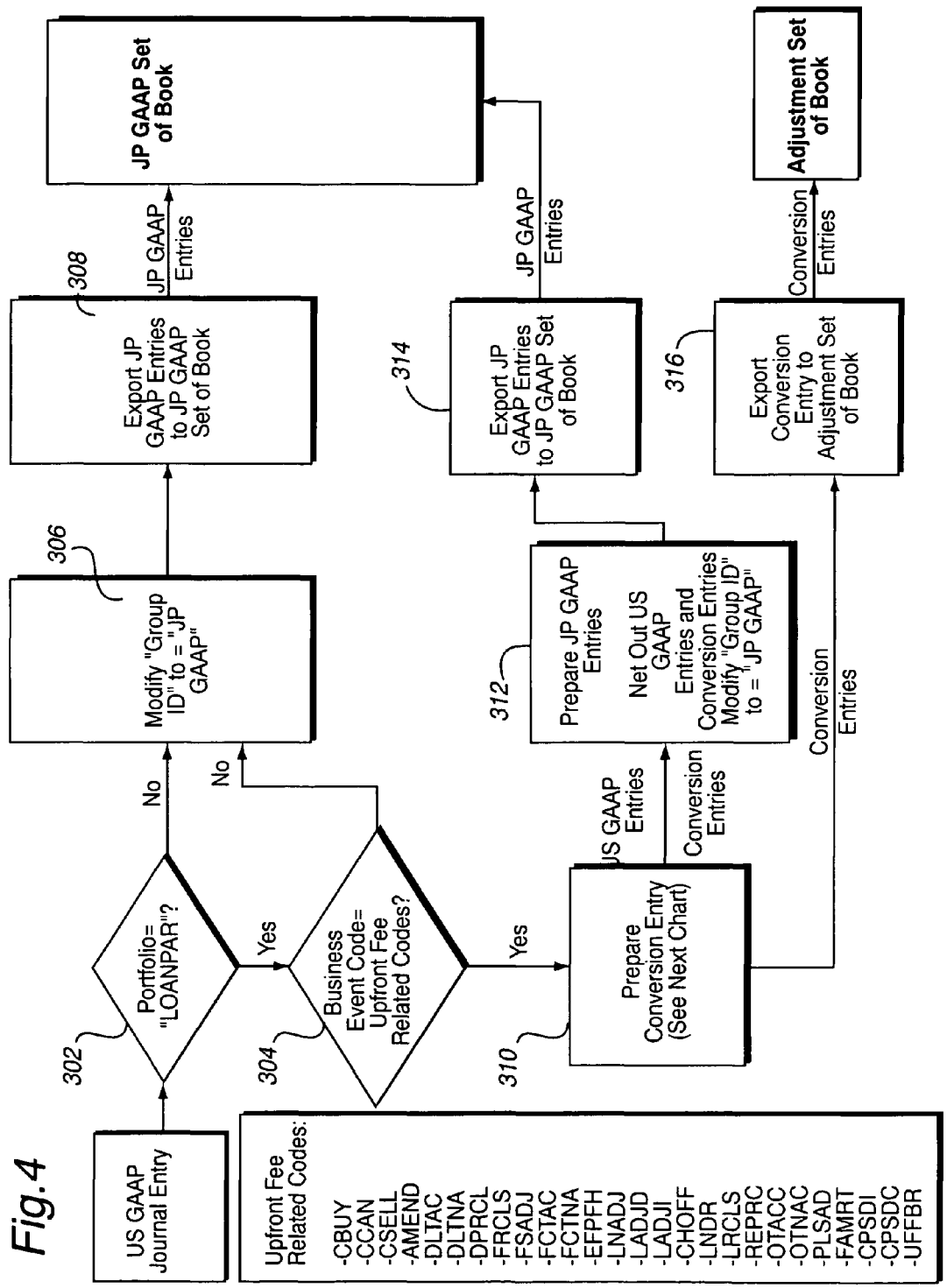
FIG. 4 is a flowchart illustrating GAAP conversion by conversion engine 108 for an Upfront fee.

FIG. 4 is a flowchart illustrating GAAP conversion by conversion engine 108 for Upfront fees. Conversion engine 108 checks the "Portfolio" of the journal entry (ST 302) to determine if "Portfolio"="LOANPAR (i.e., "Loans Originated/Purchased at Par"). If not, the "Group ID" is modified to "JP GAAP" at ST 306 and exported to JP SoB 114 at ST 308. If so, control passes to ST 304 where conversion engine 108 checks the "Business Transaction Code" of the LS2 commercial lending application (which is captured in Oracle Interface Table 106 as "Journal Categories") to determine whether it is an upfront fee related code (such as one of those identified above or one of those listed in FIG. 3). If not, the journal entry is passed to JP SoB 114 via ST 306 and ST 308 as mentioned above. If so, a Conversion journal entry is prepared at ST 310. The details of preparing a Conversion journal entry will be discussed below.

After a Conversion journal entry is prepared, JP GAAP journal entries are prepared at ST 312 based on the US GAAP journal entries and the Conversion journal entries. The JP GAAP journal entries are prepared by netting out the US and Conversion journal entries and modifying the "Group ID" to "JP GAAP". The JP GAAP journal-entries are exported to JP SoB 114 at ST 314. The Conversion journal entries prepared at ST 310 are exported to Adjustment SoB 112 at ST 316.

Figure 5:
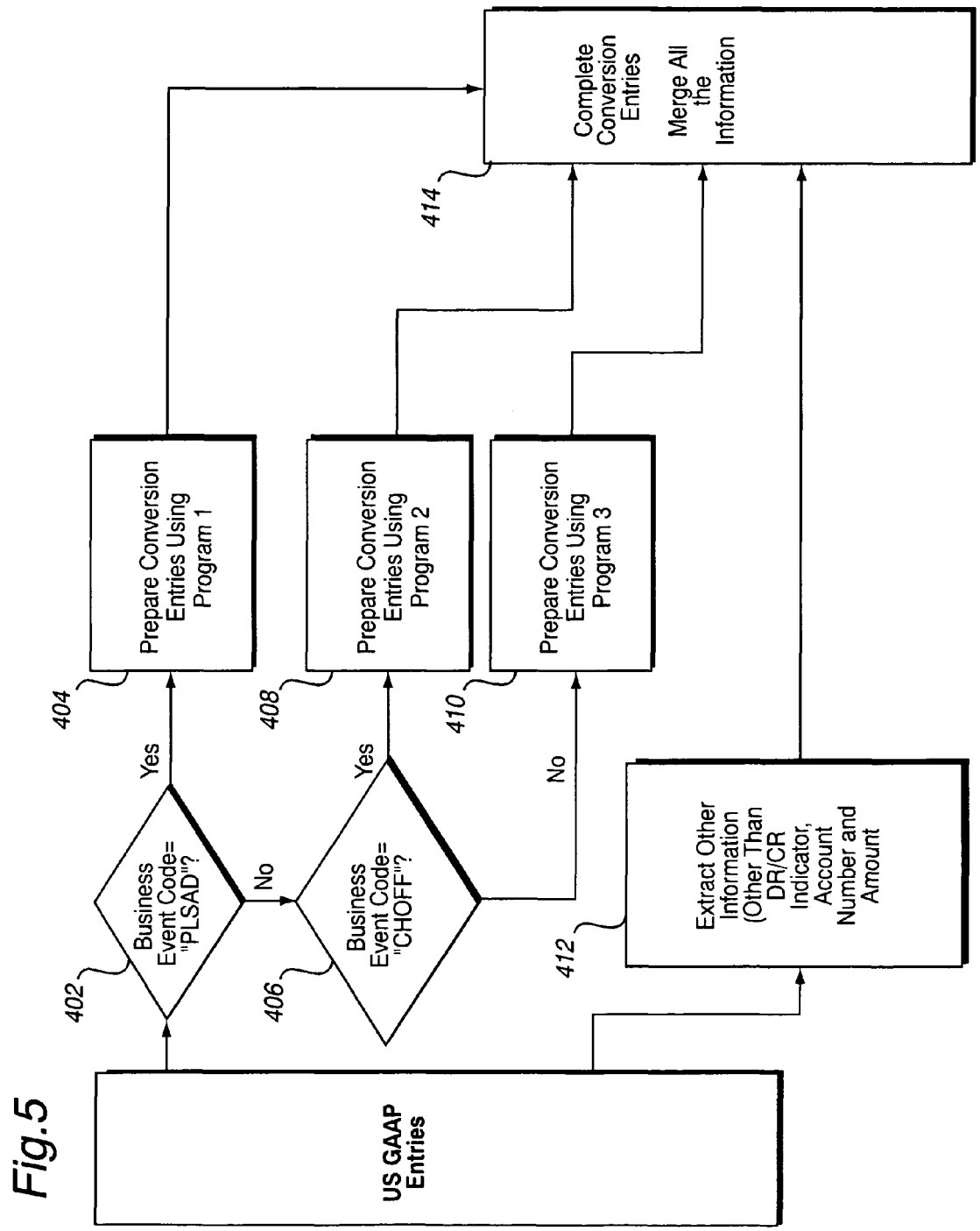
FIG. 5 is a flowchart illustrating the preparation of Conversion journal entries for an Upfront Fee.

FIG. 5 is a flowchart illustrating the preparation of Conversion journal entries for an Upfront Fee. At ST 402, conversion engine 108 determines if the "Business Event Code" is "PLSAD" (Sale of Loan). If so, the Conversion journal entries are prepared at ST 404 using Program 1 (Sale). If not, conversion engine 108 then determines if the "Business Transaction Code" is "CHOFF" (Charge Off of Loan) (ST 406). If so, the Conversion journal entries are prepared at ST 408 using Program 2 (Charge Off). If not, the Conversion journal entries are prepared at ST 410 using Program 3 (Fee Recognition).

Information other than Discrepancy Reports (DR)/Change Requests (CR) indicator, account number and amount are extracted at ST 412. The Conversion journal entry is completed and all information is merged at ST 414.

Conversion engine 108 converts journal entries on only accounts related to deferral and amortization of Upfront Loan Fee ("Upfront Fee Related Accounts"). Illustrative "Upfront Fee Related Accounts" in one implementation of the LS2 commercial lending application are listed in Table II below. The business transaction codes that are affected by GAAP Conversion are also listed.

Program 1 (Sale)

In order to prepare Conversion journal entries, conversion engine 108 extracts all the entries to the "Upfront Fee Related Accounts" in US GAAP journal entries. Conversion engine 108 then reverses these entries and posts the net amount to "Gain on Sale of Loan" or "Loss on Sale of Loan" as an adjustment to these amounts. Accordingly, "Dr/Cr Indicator" of all the US GAAP journal entries to the "Upfront Fee Related Accounts" should be reversed and net amount entered as debit or credit account of "Upfront Fee Income" to balance the Conversion journal entries.

Figure 6:
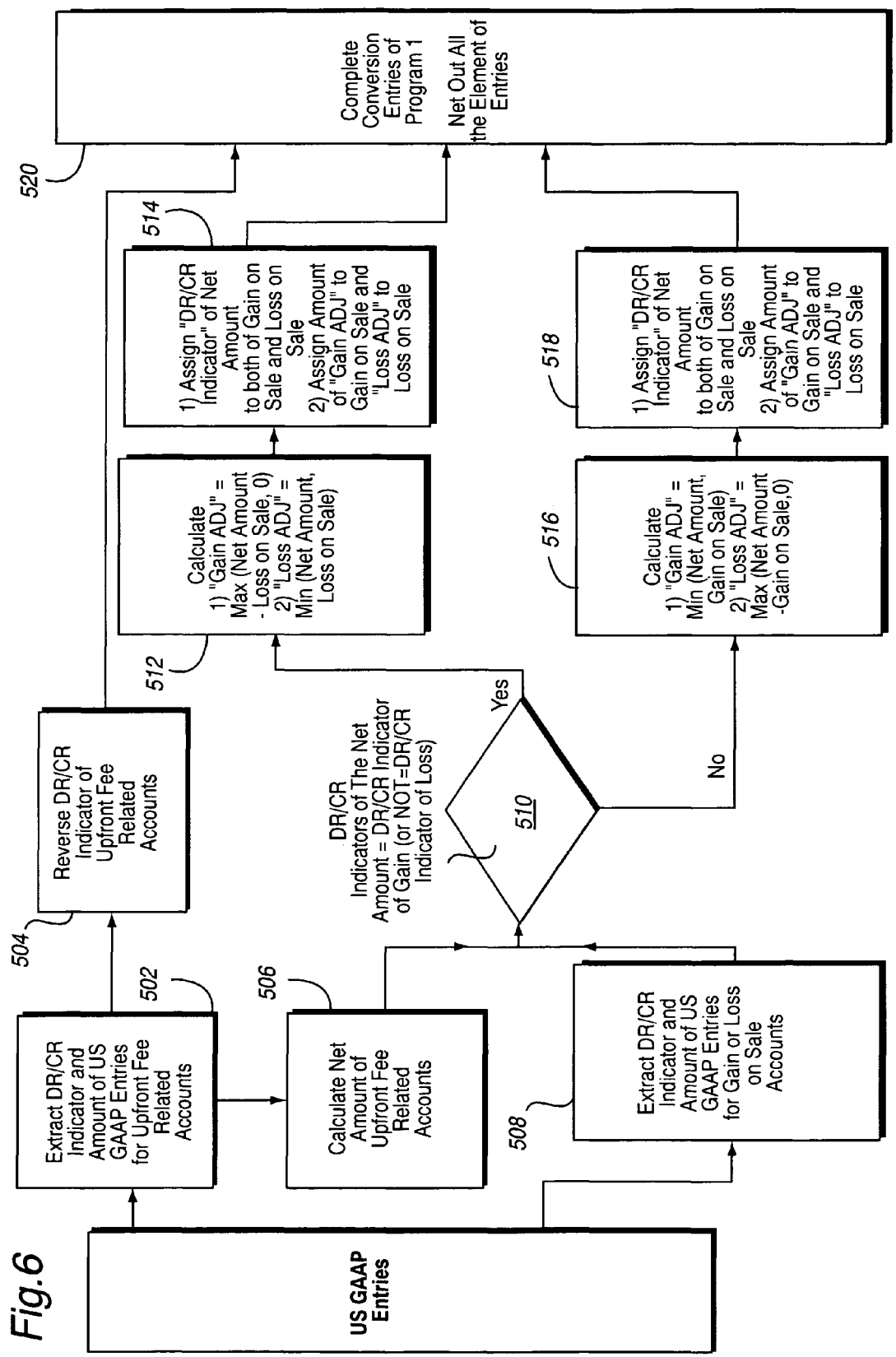
FIG. 6 is a flowchart illustrating Program 1 for preparing a Conversion journal entry (Sales) for an Upfront Fee.

FIG. 6 is a flowchart illustrating Program 1 for preparing a Conversion journal entry (Sales) for an Upfront Fee. At ST 502, DR/CR Indicator and the Amount of US GAAP entries for Upfront Fee Related Accounts are extracted from the US GAAP journal entries. At ST 504, the DR/CR indicator of Upfront Fee Related Accounts are reversed. At ST 506, the net amount of Upfront Fee Related Accounts is calculated and, at ST 508, the DR/CR indicator and amount of US GAAP entries for gain or loss on sale accounts are extracted from the US GAAP journal entries. At ST 510, it is determined whether the DR/CR indicators of the net amount are equal to the DR/CR indicator of the gain (or not equal to the DR/CR indicator of the loss). If so, at ST 512, "Gain ADJ" is calculated as "Gain ADJ"=MAX(Net Amount−Loss on Sale, 0) and "Loss ADJ" is calculated as "Loss ADJ"=MIN(Net Amount, Loss on Sale). Then, at ST 514, "DR/CR Indicator" of Net Amount is assigned to both of Gain on Sale and Loss on Sale and the amount of "Gain ADJ" is assigned to Gain on Sale and the amount of "Loss ADJ" is assigned to Loss on Sale.

If it is determined at ST 510 that the DR/CR indicators of the net amount are not equal to the DR/CR indicator of the gain (or not equal to the DR/CR indicator of the loss), then at ST 516, "Gain ADJ" is calculated as "Gain ADJ"=MIN(Net Amount, Gain on Sale) and "Loss ADJ" is calculated as "Loss ADJ"=MAX(Net Amount-Gain on Sale, 0). At ST 518, "DR/CR Indicator of Net Amount is assigned to both Gain on Sale and Loss on Sale and the Amount of "Gain ADJ" is assigned to Gain on Sale and the Amount of "Loss ADJ" is assigned to Loss On Sale.

At ST 520, the Conversion journal entries of Program 1 are completed and all the elements of the journal entries are netted out.

Computation of Adjustment to Gain and Loss

More specifically, the amount to be adjusted to "Gain on Sale (GNOSL)" or "Loss on Sale (LSOSL)" as Conversion journal entries should be determined as follows:

i) Unamortized Discount

Amount to be adjusted to "Gain on Sale (GNOSL)"=Minimum (Unamortized Discount under US GAAP, "Gain on Sale (GNOSL)" under US GAAP), and Amount to be adjusted to "Loss on Sale (LSOSL)"=Maximum (Unamortized Discount under US GAAP—"Gain on Sale (GNOSL)" under US GAAP, 0)

If the US GAAP journal entry is a normal sale transaction, the adjustment amount should be debited to "Gain on Sale (GNOSL)" and "Loss on Sale (LSOSL)" and credited to "Position Discount (DISC)" or "Unfunded Discount (UNFDS)" to prepare the Conversion journal entry.

If the US GAAP journal entry is a reversal of original sale transaction for correction, the adjustment amount should be credited to "Gain on Sale (GNOSL)" and "Loss on Sale (LSOSL)" and debited to "Position Discount (DISC)" or "Unfunded Discount (UNFDS)" to prepare the Conversion journal entry.

Unamortized Premium

Amount to be adjusted to "Gain on Sale (GNOSL)"=Maximum (Unamortized Premium under US GAAP—"Gain on Loss (LSOSL)" under US GAAP, 0) and Amount to be adjusted to "Loss on Sale (LSOSL)"=Minimum (Unamortized Premium under US GAAP, "Gain on Loss (LSOSL)" under US GAAP).

If the US GAAP journal entry is normal sale transaction, the adjustment amount should be credited to "Gain on Sale (GNOSL)" and "Loss on Sale (LSOSL)" and debited to "Position Discount (DISC)" or "Unfunded Discount(UNFDS)" to prepare the Conversion journal entry.

If the US GAAP journal entry is a reversal of original sale transaction for correction, the adjustment amount should be debited to "Gain on Sale (GNOSL)" and "Loss on Sale (LSOSL)" and credited to "Position Discount (DISC)" or "Unfunded Discount (UNFDS)" to prepare the Conversion journal entry.

Examples of adjustments to Gain and Loss on Sale are shown in Table III (Gain and Loss on Loan Sale).

Program 2 (Charge Off)

In order to prepare Conversion journal entries, conversion engine 108 extracts all the entries to the "Upfront Fee Related Accounts". Conversion engine 108 then reverses these entries and posts the net amount to "Loss On Charge Off (ALLOW)" as adjustments to the account. Conversion engine 108, accordingly, will reverse "Dr/Cr Indicator" of all the US GAAP journal entries to the "Upfront Fee Related Accounts" and enter the net amount to debit or credit account of "Loss On Charge Off (ALLOW)" to balance the Conversion journal entries.

Figure 7:
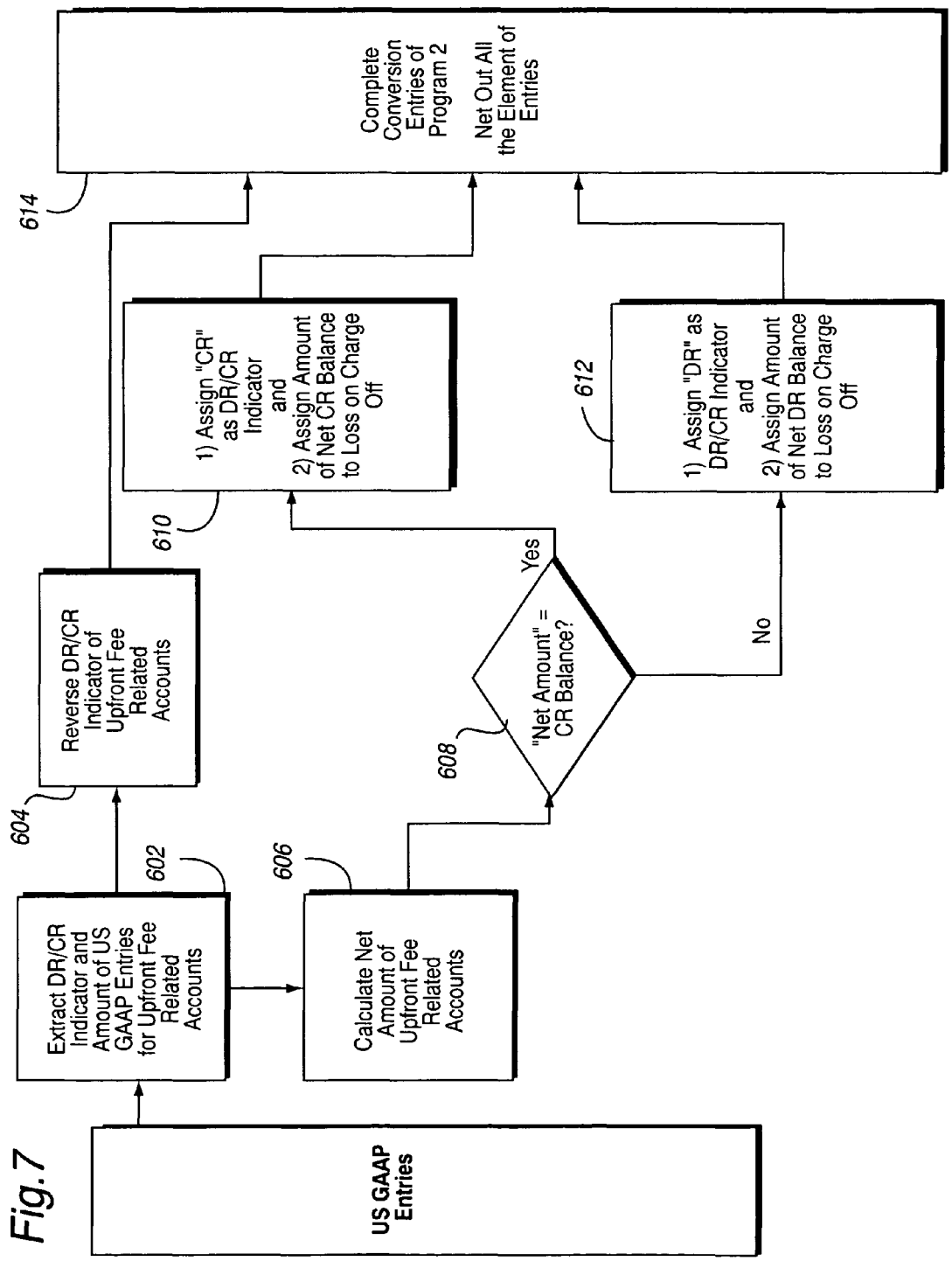
FIG. 7 is a flowchart illustrating Program 2 for preparing a Conversion journal entry (Charge Off) for an Upfront Fee.

FIG. 7 is a flowchart illustrating Program 2 for preparing a Conversion journal entry (Charge Off) for an Upfront Fee. At ST 602, DR/CR Indicator and the Amount of US GAAP entries for Upfront Fee Related Accounts are extracted from the US GAAP journal entries. At ST 604, the DR/CR indicator of Upfront Fee Related Accounts are reversed. At ST 606, the net amount of Upfront Fee Related Accounts is calculated and at ST 608 it is determined whether "Net Amount"=CR Balance. If so, "CR" is assigned as the DR/CR indicator and the Amount of Net CR Balance is assigned to Loss on Charge Off at ST 610. If not, "DR" is assigned as the DR/CR indicator and the Amount of Net DR Balance is assigned to Loss on Charge Off at ST 612.

At ST 614, the Conversion journal entries of Program 2 are completed and all the elements of the journal entries are netted out.

Program 3 (Fee Recognition)

In order to prepare Conversion journal entries, conversion engine 108 extracts all the entries to the "Upfront Fee Related Accounts". Conversion engine 108 then reverses these entries and posts the net amount to "Upfront Fee Income" as adjustments to the account (or an offset account). Conversion engine 108, accordingly, will reverse "Dr/Cr Indicator" of all the US GAAP journal entries to the "Upfront Fee Related Accounts" and enter the net amount to debit or credit account of "Upfront Fee Income" to balance the Conversion journal entries.

"Upfront Fee Income" is created for Loan on Notes (A/C #544301 Upfront Loan Fee Income (Loan on Note)), Loan on Certificate (A/C #544302 Upfront Loan Fee Income (Loan on Certificate)) and other products (A/C #544303 Upfront Loan Fee Income (Other)), respectively. These account distributions are determined based on "Risk Type" supplied from the LS2 commercial lending application and captured in the Oracle interface table 106.

Figure 8:
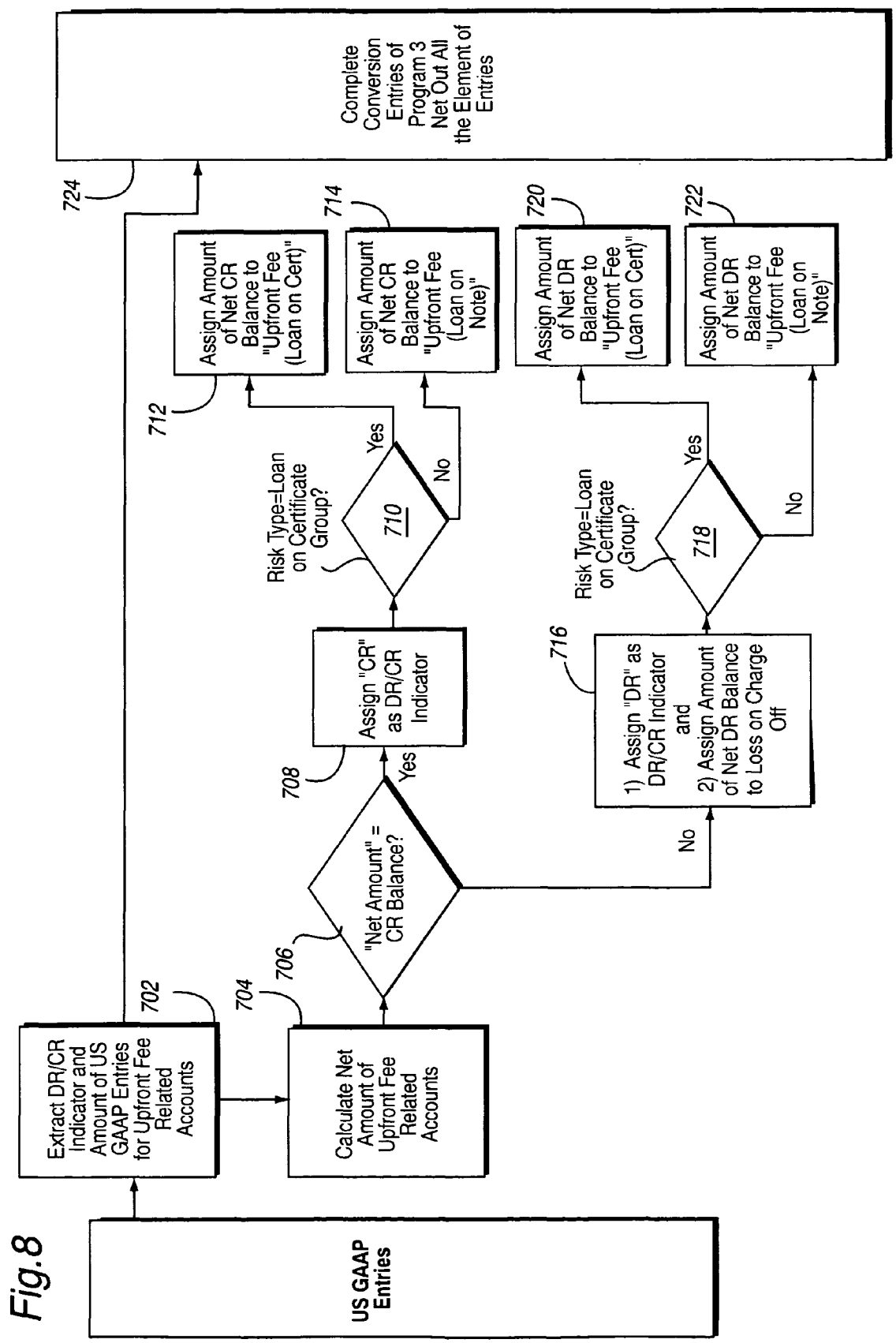
FIG. 8 is a flowchart illustrating Program 3 for preparing a Conversion journal entry (Fee Recognition) for an Upfront Fee.

FIG. 8 is a flowchart illustrating Program 3 for preparing a Conversion journal entry (Fee Recognition) for an Upfront Fee. At ST 702, DR/CR Indicator and the Amount of US GAAP entries for Upfront Fee Related Accounts are extracted from the US GAAP journal entries. At ST 704, the net amount of Upfront Fee Related Accounts is calculated and at ST 706 it is determined whether "Net Amount"=CR Balance. If so, "CR" is assigned as the DR/CR indicator at ST 708 and it is determined at ST 710 whether Risk Type=Loan on Certificate Group. If so, the Amount of Net CR Balance is assigned to "Upfront Fee (Loan Cert)" at ST 712. If not, the Amount of Net CR Balance is assigned to "Upfront Fee (Loan on Note)" at ST 714.

If at ST 706, it is determined that "Net Amount" does not equal CR Balance, at ST 716, "DR" is assigned as the DR/CR indicator and the Amount of Net DR Balance is assigned to Loss on Charge Off. Then, at ST 718, it is determined whether Risk Type=Loan on Certificate Group. If so, the Amount of Net DR Balance is assigned to Upfront Fee (Loan on Cert) at ST 720. If not, the Amount of Net DR Balance is assigned to "Upfront Fee (Loan on Note)" at ST 722.

At ST 724, the Conversion journal entries of Program 3 are completed and all the elements of the journal entries are netted out.

II. Loans Held for Sale

US GAAP

Loans held for sale are reported at the Lower of Cost or Market Value (LOCOM).

JP GAAP

Loans held for sale are reported at cost.

A. Issues

In accordance with US GAAP, loans held for sale are reported at the Lower of Cost or Market Value (LOCOM). In accordance with JP GAAP, loans held for sale are reported at cost. The LS2 commercial lending application allows users to value facility held for sale at LOCOM in accordance with US GAAP (AICPA's Guideline). A user may chose an accounting method for facility held for sale in compliance with JP GAAP that requires the Cost Method. Users in US branches select LOCOM for accounting for facility held for sale in accordance with AICPA's Guideline. Therefore, for JP GAAP reporting purposes, unrealized losses recognized under US GAAP should be reversed.

B. Solution/Conversion

Journal Entry Conversion Summary

All the US GAAP journal entries regarding LOCOM revaluation are reversed using conversion engine 108 to create proper JP GAAP accounting consequences. The journal entries to reverse US GAAP journal entries are submitted to Adjustment SoB 112 as Conversion journal entries. In this case, no JP GAAP journal entries are submitted to JP SoB 114.

Journal Entry Conversion Detail

The LS2 commercial lending application records LOCOM valuation loss via end of day batch entry ("EOD Batch Entry") by posting life-to-date unrealized loss on Trade Date Available Position and Open Sale Position (sold but not settled) and reversing corresponding amount at end of previous day. The LS2 commercial lending application generates these journal entries for the "Business Transaction Code"=DLYPL (Daily Posting of Unrealized P&L).

US SoB interface information includes "Business Transaction Code", Oracle GL Account Code", "DR/CR Identifier" "Amount" as well as other information required for accounting purposes. If conversion engine 108 receives journal entries for LOCOM revaluation, i.e. "Business Transaction Code"="DLYPL" (This is captured as "Journal Categories Name" in Oracle Interface Table"), conversion engine 108 prepares the Conversion journal entries and submits the entries to the Adjustment SoB.

(1) Conversion Journal Entries

Conversion engine 108 prepares Conversion journal entries to reverse US GAAP journal entries regarding posting and reversing LOCOM valuation loss. These entries are prepared by reversing all the "DR/CR Identifier" of US GAAP journal entries related to LOCOM valuation.

(2) JP GAAP Journal Entries

In this case, no journal entries are submitted to JP SoB 114 because JP GAAP requires no LOCOM valuation for loans.

Figure 9:
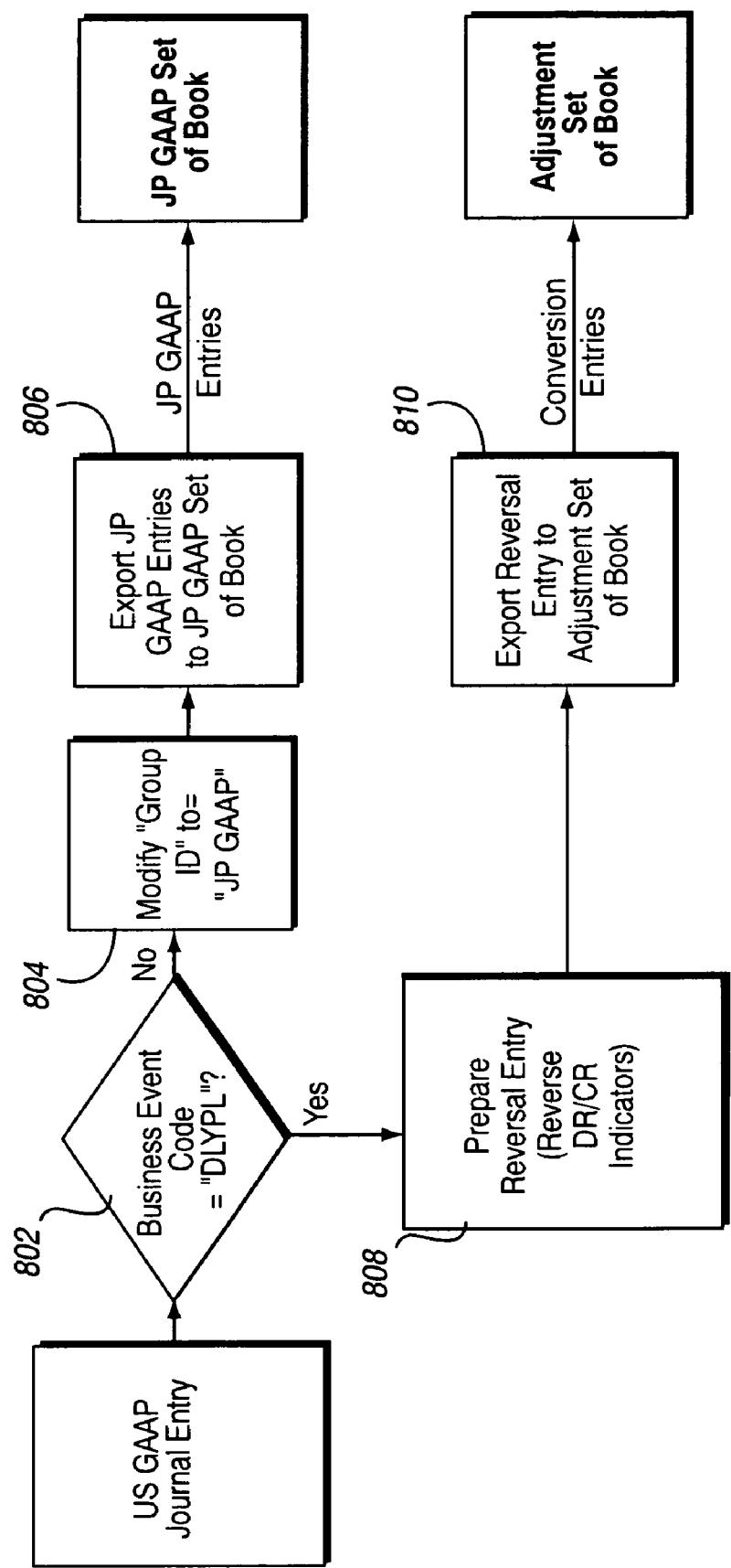
FIG. 9 is a flowchart illustrating GAAP Conversion for Loan Held for Sale and Trading Loan.

Table IV shows sample journal entries (Journal Entries for Loan Held for Sale) and FIG. 9 is a high level flowchart (GAAP Conversion for Loan Held for Sale and Trading Loan).

At ST 802, conversion engine 108 determines whether the Business Transaction Event Code="DLYPL." If so, the "Group ID" is modified to "JP GAAP" at ST 804 and the JP GAAP journal entries are exported to JP SoB 114 at ST 806. If the Business Event Code does not equal "DLYPL", a reversal entry is prepared (DR/CR Indicators are reversed) at ST 808 and the reversal journal entry is exported to Adjustment SoB 112 at ST 810.

Other interface information for US GAAP General Ledger, e.g. "Date of Creation", "Accounting Date", "Product Code", "Customer Code" etc. are submitted to Adjustment SoB 112 without modification except for "Journal Category Name". "Journal Category Name" for "US SoB" is "US GAAP"; however, this will be replaced with "Conversion" for Adjustment journal entries.

III. Loans Held for Trading

US GAAP

Loans held for trading are marked to market.

JP GAAP

Loans held for sale are reported at cost.

A. Issues

In accordance with US GAAP, loans held for trading are marked to market (MTM). In accordance with JP GAAP, loans held for sale are reported at cost. The LS2 commercial lending application allows users to value facility held for trading at mark to market in accordance with US GAAP. Users may also chose an accounting method for facility held for trading in compliance with JP GAAP which requires the Cost Method. However, users in US branches will select mark to market accounting for facility held for trading in accordance with US GAAP; therefore, for JP GAAP reporting purposes, unrealized gain/losses recognized under US GAAP should be reversed.

B. Solution/Conversion

Journal Entry Conversion Summary

All the US GAAP journal entries regarding MTM revaluation are reversed by using conversion engine 108 to create proper JP GAAP accounting consequences. The journal entries to reverse US GAAP journal entries are submitted to Adjustment SoB 112 as Conversion journal entries. In this case, no JP GAAP journal entries are submitted to JP SoB 114.

Journal Entry Conversion Detail

The LS2 commercial lending application records MTM revaluation gain/loss via end of day batch entry ("EOD Batch Entry") by posting life-to-date unrealized gain/loss on Trade Date Available Position and Open Sale Position (sold but not settled) and reversing corresponding amount at end of previous day. The LS2 commercial lending application generates these journal entries for the "Business Transaction Code"=DLYPL (Daily Posting of Unrealized P&L).

US SoB interface information includes "Business Transaction Code", "Oracle GL Account Code", "DR/CR Identifier", "Amount" as well as other information required for accounting purposes. If conversion engine 108 receives journal entries for M™ revaluation, i.e. "Business Transaction Code"="DLYPL" (this is captured as "Journal Categories Name" in Oracle Interface Table), conversion engine 108 prepares the Conversion journal entries and submits the entries to the Adjustment SoB.

(1) Conversion Journal Entries

Conversion engine 108 prepares Conversion journal entries to reverse US GAAP journal entries regarding posting and reversing MTM valuation gain/loss. These entries are prepared by reversing all the "DR/CR Identifier" of US GAAP journal entries related to MTM valuation.

(2) JP GAAP Journal Entries

In this case, no journal entries are submitted to JP SoB 114 because JP GAAP requires no MTM valuation for loans.

Table V shows sample journal entries (Journal Entries for Trading Loan) and FIG. 9 shows the high level flowchart (GAAP Conversion for Loan Held for Sale and Trading Loan).

Other interface information for US SoB, e.g. "Date of Creation", "Accounting Date", "Product Code", "Customer Code" etc. is submitted to Adjustment SoB 112 and JP SoB 114 without modification except for "Group ID". The "Group ID" for "US SoB" is "US GAAP"; however, this is replaced with "Conversion" for Adjustment SoB.

IV. Stand-by Letters of Credit or Guarantees

US GAAP

Stand-by Letter of Credit, Guarantees, and Other Risk Participation generally have no immediate accounting effect (though memorandum entries will be made as contingent liabilities).

JP GAAP

Stand-by Letter of Credit, Guarantees, and Other Risk Participation are recorded on the balance sheet as contingent liabilities. Related contingent receivables are also recorded on the balance sheet in the same amount. (Actual Balance Sheet Entry).

A. Issue

The LS2 commercial lending application originates journal entries for SBLCs and Guarantees as memorandum entries in accordance with US practices. To comply with JP GAAP, these entries are reclassified into balance sheet entries.

B. Solution/Conversion

The LS2 commercial lending application books SBLC and Guarantee principal as memorandum entry in accordance with US GAAP. However, JP GAAP and US GAAP financial statements can have different summarization of accounts because Oracle General Ledger system will have separate SoB for JP GAAP and US GAAP, respectively. When General Ledger system compiles JP GAAP financial statement based on JP SoB, SBLC and Guarantee principal account and its offset account will be included in balance sheet as "Customer's Liability on Acceptance and Guarantee" and "Acceptance and Guarantee Outstanding", respectively. When General Ledger system compiles US GAAP financial statement based on US SoB, SBLC and Guarantee principal account and its offset account will not be included in the balance sheet.

V. Stand-by Letters of Credit or Guarantees Sold

US GAAP

Stand-by Letter of Credit and Guarantee Sold are recorded as contingent liability (Memorandum Entry).

JP GAAP

Stand-by Letter of Credit and Guarantee Sold are recorded as contingent liability (Actual Balance Sheet Entry).

A. Issue

If SBLC and Guarantee is sold, the LS2 commercial lending application reclassifies the debit account of memo entry from the account for own share to the account for participant share. The resultant entries will be as follows:

Dr) LC Principal Account (LCPRN)

Dr) LC Principal Sold (LCSLD)

Cr) LC Principal Offset (LCCON)

JP GAAP treatment is basically consistent with US GAAP treatment. However, some MIS systems may be designed to record the LC sold amount separately not only to debit account but also to credit account (Offset Account).

B. Solution/Conversion

Journal Entries Conversion Summary

Conversion engine 108 prepares Conversion journal entries to separate the sold amount included in "LC Principal Offset (LCCON)" and record the amount as "LC Principal Sold Offset (SDCON)".

Journal Entries Conversion Detail

If conversion engine 108 receives journal entries related to LC Principal, it performs the following computation:

Value A=LC Principal Sold (LCSLD)

Value A will be deducted from LC Principal Offset (LCCON) and recorded as "LC Principal Sold Offset (SDCON)".

In normal LC issuance transactions, the balance of LC Principal (LCCON) is credit account and the Conversion journal entries will be as follows:

Dr) LC Principal Offset (LCCON)

Cr) LC Principal Sold Offset (SDCON)

In reduction of LC principal, e.g. cancellation or expiration, the Conversion journal entry is as follows:

Dr) LC Principal Sold Offset (SDCON)

Cr) LC Principal Offset (LCCON)

Table VI shows sample journal entries (Journal Entries for SBLC Sold).

Figure 10:
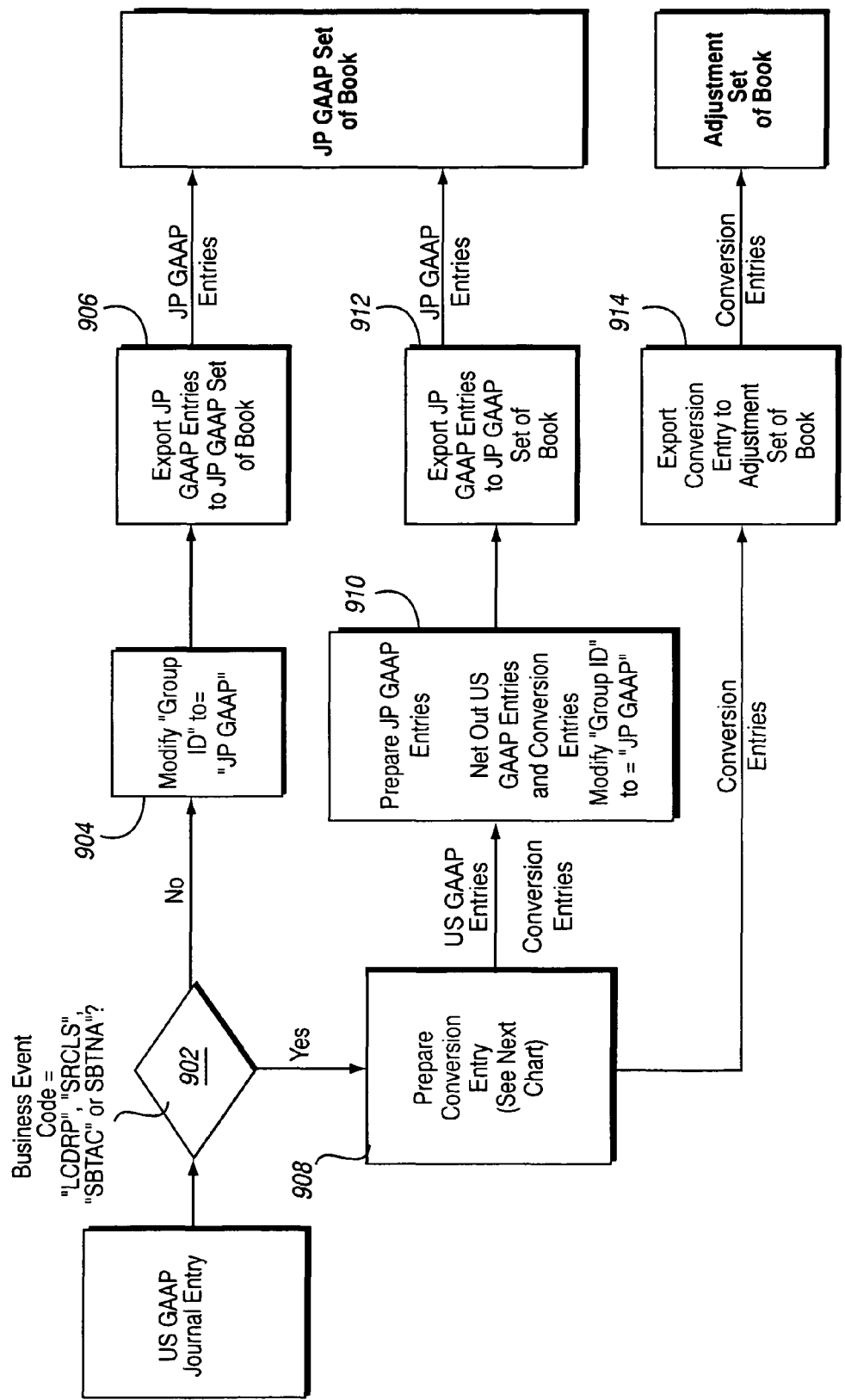
FIG. 10 is a flowchart illustrating GAAP Conversion for SBLC Sold.

FIG. 10 is a flowchart showing GAAP Conversion for SBLC Sold. At ST 902, it is determined whether the Business Transaction Code="LCDRP", "SRCLS", "SBTAC" or "SBTNA". If not, the "GroupID" is modified to "JP GAAP" at ST 904 and the JP GAAP journal entries are exported to JP SoB 114 at ST 906. If the Business Transaction Code is equal to "LCDRP", "SRCLS", "SBTAC" or "SBTNA", a Conversion journal entry is prepared at ST 908 as will be described in greater detail with reference to FIG. 11. US GAAP journal entries and Conversion journal entries are used at ST 910 to prepare JP GAAP journal entries. The US GAAP and Conversion journal entries are netted out and the "Group ID" is modified to "JP GAAP". The JP GAAP journal entries are exported to JP SoB 114 at ST 912. The Conversion journal entries are exported to Adjustment SoB at ST 914.

FIG. 11 is a flowchart illustrating preparation of a Conversion journal entry for SBLC sold. At ST 1002, the DR/CR indicator and the amounts of the US GAAP journal entries for Account #291501, 292502 or 293501 are extracted. At ST 1004, a journal entry for LC Outstanding Offset (491001) is prepared by assigning Account number 491001, assigning the extracted amount and assigning the extracted DR/Cr indicator. At ST 1006, a journal entry for LC Outstanding Sold Offset (491501) is prepared by assigning Account number 491501, assigning the extracted amount and reversing the extracted DR/CR indicator. At ST 1008, all other information for the journal entries (other than DR/CR indicator, Account Number and Amount) is extracted. When the journal entries are completed, all the information is merged at ST 1010.

VI. Presentation of Premium/Discount on Loans

US GAAP

Premium/discount on loan is deducted from loan principal amount for US GAAP financial statement presentation.

JP GAAP

Loan balances are presented at principal amount. Premium and discount are presented as prepaid expenses and unearned income, respectively, (separate balance sheet item) rather than a deduction from loan balances.

A. Issue

Presentation of premium and discount on loans are different in US GAAP and JP GAAP financial statement. Premium and discount is deducted from loan balances in US GAAP financial statements while premium and discount is separately presented as prepaid expenses and unearned income in JP GAAP financial statements.

B. Solution/Conversion

The LS2 commercial lending application has separate GL accounts for premium and discount on loan in addition to an account for principal amount. JP GAAP and US GAAP financial statements can have different summarization of accounts because the General Ledger system will have separate SoBs for JP GAAP and US GAAP, respectively. When the General Ledger system compiles JP GAAP financial statement based on JP SoB 114, premium and discount on loan will be included in "Prepaid Expenses" and "Unearned Income", respectively. When the General Ledger system compiles US GAAP financial statement based on US SoB 110, premium and discount on loan will be deducted from "Loan" balance.

VII. Presentation of Allowance for Loan Losses

US GAAP

Allowance for loan losses should be deducted from loan principal amount for US GAAP financial statement presentation.

JP GAAP

Allowance for loan losses are separate balance sheet items (liability account) for JP GAAP financial statement presentation.

A. Issue

Presentation of allowance for loan losses is different in US GAAP and JP GAAP financial statements. Loan balance should be presented net of allowance for loan losses in US GAAP financial statements while allowance for loan losses should be presented as separate liability account in JP GAAP financial statements.

B. Solution/Conversion

The LS2 commercial lending application has a separate GL account for allowance for loan losses in addition to an account for principal amount. JP GAAP and US GAAP financial statements can have different summarization of accounts because the General Ledger system will have separate SoBs for JP GAAP and US GAAP, respectively. When the General Ledger system compiles JP GAAP financial statement based on JP SoB 114, allowance for loan losses will be presented as separate liability account. When the General Ledger system compiles US GAAP financial statement based on US SoB 110, allowance for loan losses will be deducted from "Loan" balance.

VII. Presentation of Loan Balances

US GAAP

Separate balance sheet captions are required for each portfolio (held to maturity or held for sale). Additional disclosures are also required based on loan classifications based on collateral type, counter party and maturity.

JP GAAP

Separate balance sheet caption for each legal form of loan (loan on certificate or loan on notes).

A. Issue

The LS2 commercial lending application has loan classification code tables only in accordance with US rules.

B. Solution/Conversion

Additional MIS codes for Japanese loan classifications (loan on notes and loan on certificate) are attached to each loan deal. Each journal entry regarding loans will be accompanied by the MIS code. The General Ledger system will have separate accounts for "Loan on Certificate" and "Loan on Note" with respect to each GL Class Code. When the General Ledger system receives journal entries regarding loans, the system distinguishes "Loan on Notes" and "Loan on Certificate" based on the MIS Code and assigns appropriate GL account codes.

IX. Non-Performing Loans

US GAAP

No quantitative GAAP criteria for non-accrual status exist (FASB Statements No. 114 and 118). Federal Reserve Bank prefers suspension of interest accrual on 90-days past due or principal past due or critical events.

JP GAAP

Accrual of interest income on impaired loans is suspended in accordance with the criteria stipulated in the Japanese tax regulations. Generally, accrual is suspended on loans the principal of which are past due or the interest is past due more than six months or critical credit events.

A. Issue

The LS2 commercial lending application has separate accounts for accrual status facility/loan and non accrual status facility/loan with respect to Commitment Balance, Loan Principal Amount, and Position Discount and Position Premium Account and will reclassify corresponding balances from accrual status accounts to non-accrual status accounts if certain credit events occur. The LS2 commercial lending application also reverses all the outstanding accrued interest receivable on non-accrual loans and post memorandum entries for accrued interest on the non-accrual status loans. In addition, if the facility is non-accrual status, the amortization of Position Discount/Premium will be suspended and all the outstanding accrued fee receivable will be also reversed (no memorandum entries for accrued fee will be recorded on non-accrual loans and facilities).

Users in US branches should account for non-accrual loans in accordance with US Regulatory Accounting and the transfer to non-accrual status will occur upon 90 days past due or principal past due loans or critical credit events. However, a Japanese office may select the timing of transfer to non-accrual status in accordance with JP GAAP even for US GAAP reporting purposes. Accordingly, in official US SoB 110, the non-accrual loans will be accounted for using the above LS2 functionality although the timing of transfer is in accordance with JP GAAP.

Under JP GAAP, timing to transfer to non-accrual status is less conservative than US GAAP because it is in accordance with Japanese tax rules. In addition the timing, accounting treatment of outstanding accrued interest (recorded in prior year and before credit event) is different from US GAAP/ Regulatory accounting. Normally, the following accrued interest will not be recorded:

i) After the principal's due date, the accrued interest income will not be recorded. However, the accrued interest income up to principal due date should be recorded unless it should not be recognized due to other criteria below.

ii) At each fiscal year end, if collection of interest has not occurred at all as to interest receivable that became due more than 6 months before, the accrued interest income during the fiscal year for the loan will not be recognized. However, for the loan, if the accrued interest receivable which was recorded at the last fiscal year end is still outstanding, the amount should not be reversed unless the receivable meets the criteria to write-off (outstanding for 2 years or more).

iii) If the collection of the accrued interest receivable (whether recorded or unrecorded) at past fiscal year is very small (less than 5%), the accrued interest income for this fiscal year and will not be recorded. However, the past years' outstanding accrued interest receivable will not be reversed unless the receivable meets the criteria to write-off (outstanding for 2 years or more).

B. Solution/Conversion

Journal Entry Conversion (1) US Regulatory Adjustment

As explained above, the timing of transfer to non-accrual status will be consistent between the US and JP SoBs. However, in US branches, for US Regulatory Reporting purposes, manual additional reversal of accrued interest on 90 days past due loans should be made outside the LS2 commercial lending application, e.g. using Excel spread sheet.

On the other hand, for JP GAAP reporting purposes, additional accrual on non-accrual loan, which does not meet charge-off criteria, should be recorded. This entry will be input into conversion engine 108 as Conversion journal entries and fed to both of the Adjustment SoB 112 and JP SoB 114. At each fiscal year end, the detailed information regarding non-accrual loans and related accrued interest receivable may be reviewed (e.g., by a Controller Department). Based on that review, the Controller Department will calculate additional accrued interest receivable that should be accrued under JP GAAP. These Conversion journal entries will be input manually through the Manual GL entry function of the conversion engine.

Other interface information for US SoB, e.g. "Date of Creation", "Accounting Date", "Product Code", "Customer Code" etc. is submitted to Adjustment SoB 112 without modification except for "Group ID". "Group ID" for "US SoB" is "US GAAP, however, this will be replaced with "JP GAAP" for JP SoB 114.

X. Direct Loan Origination Costs

US GAAP

Direct loan origination costs will be deferred and recognized over the contractual life of the loan as an adjustment of yield using the interest method in accordance with FASB Statement No. 91.

JP GAAP

Fees and commissions earned for loan origination are recognized when related services are provided (normally when received). Loan origination costs including direct and indirect costs should be charged to income when incurred. No deferral and amortization of these fees and costs as an adjustment of yield is recorded.

A. Issue 1

Many users of the LS2 commercial lending application do not use LS2 for deferral and amortization of direct loan cost. Instead, total direct costs incurred for all the loan origination activities for the period may be allocated among each deal (e.g., by a Controller Department or a Loan Back Office Department). Related entries are input into general ledger system directly by the Controller Department or the Loan Back Office Department.

B. Solution 1

Defer and amortize direct loan origination costs outside LS2.

C. Issue 2

Deferral and amortization of direct loan origination costs in accordance with FASB Statement 91 will be recorded under US GAAP. However, the deferral and amortization should be reversed for Japanese reporting purposes.

D. Solution 2

Conversion journal entries to reverse US GAAP journal entries will be prepared and input into general ledger system directly by a Controller Department or a Loan Back Office Department to create JP SoB 114.

The financial reporting system and method described above provides a single workflow that converts a book of original entries in one accounting system to another reporting book in a different accounting system. The system and method allow a user to set up the accounting method of various items according to any country's generally accepted accounting principles (GAAP).

The GAAP conversions described above are provided as examples of conversions that can be implemented using a conversion engine in accordance with an embodiment of the present invention. It will be readily apparent that PL/SQL procedures may be generated to implement conversions that account for other GAAP differences.

Additionally, conversions between US and JP GAAP are provided to illustrate the benefits that can be obtained using a conversion engine. It is contemplated that procedures may be developed to provide conversions between any two or more GAAP standards.

While particular embodiments of the present invention have been described and illustrated, it should be understood that the invention is not limited thereto because modifications may be made by persons skilled in the art. The present application contemplates any and all modifications that fall within the spirit and scope of the underlying invention discloses and claimed herein.

TABLE I

UPFEE

Journal Entries for Upfront Loan Fee

| | | | |
|---|---|---|---|
| Term of Loan | | 3 Years | |
| Syndication Out | | 50% | |
| Syndication Close-Out | Day 3 | | |
| First Loan Drawdown | Day 4 | | |
| | | | |
| Upfront Fee | | | |
| Receipt - Part 1 | Day 1 | $ 100,000.00 | |
| Receipt - Part 2 | Day 2 | $ 50,000.00 | |
| Distribution to Participant | Day 3 | $ (50,000.00) | |
| Transfer to Discount Amount (Host's Share) | Day 3 | $ (75,000.00) | |
| Remainder (Syndication Fee) | Day 3 | $ 25,000.00 | |
| Sale of Loan | Sale Price | $ 980,000.00 | |
| | Principal | $1,000,000.00 | |
| Charge-Off | At Month End 4 | All Amount | |

| | | |
|---|---|---|
| Discount Amount (Host's Share) | At Month End 4 | $ 75,000.00 |
| Amortization: | | |
| Month 1 | | $(15,000.00) |
| Month 2 | | $(15,000.00) |
| Month 3 | | $(15,000.00) |
| At Month End 4 | | $ 15,000.00 |

US GAAP Journal Entries

| | Dr/Cr | GL_AC NO | LS2 GL Short | Description | Amount |
|---|---|---|---|---|---|
| Day 1 Receipt of Upfront Fee (Part 1) | Dr) | 423001 | MT/DDA | Nostro Clearing | $100,000.00 |
| | Cr) | 415504 | FHAD | Fee Held Awaiting Disposition | $100,000.00 |
| Day 2 Receipt of Upfront Fee (Part 2) | Dr) | 423001 | MT/DDA | Nostro Clearing | $ 50,000.00 |
| | Cr) | 415504 | FHAD | Fee Held Awaiting Disposition | $ 50,000.00 |
| Day 3 Distribution to Participant | Dr) | 415504 | FHAD | Fee Held Awaiting Disposition | $ 50,000.00 |
| | Cr) | 423001 | MT/DDA | Nostro Clearing | $ 50,000.00 |
| Day 3 Syndication Close Out | Dr) | 415504 | FHAD | Fee Held Awaiting Disposition | $100,000.00 |
| | Cr) | 415503 | UNFDS | Unfunded Discount | $ 75,000.00 |
| | Cr) | 544101 | SYNFM | Syndication Fee/Mgr | $ 25,000.00 |
| Day 4 Transfer of Discount from Unfunded Discount to Discount Position | Dr) | 415001 | DISC | Position Discount | $ 75,000.00 |
| | Cr) | 415503 | UNFDS | Unfunded Discount | $ 75,000.00 |
| Month 1, 2, 3, 4 | Dr) | 415001 | DISC | Position Discount | $ 15,000.00 |

GAAP Conversion Journal Entries

| | Dr/Cr | GL_AC NO | LS2 GL Short | Description | Amount |
|---|---|---|---|---|---|
| Day 1 | Dr) | 423001 | MT/DDA | Fee Held Awaiting Disposition | $100,000.00 |
| | Cr) | 544302 | N/A | Upfront Fee Income | $100,000.00 |
| Day 2 | Dr) | 415504 | FHAD | Fee Held Awaiting Disposition | $ 50,000.00 |
| | Cr) | 544302 | N/A | Upfront Fee Income | $ 50,000.00 |
| Day 3 | Dr) | 415504 | FHAD | Fee Held Awaiting Disposition | $ 50,000.00 |
| | Cr) | 423001 | MT/DDA | Nostro Clearing | $ 50,000.00 |
| Day 3 | Dr) | 415504 | FHAD | Fee Held Awaiting Disposition | $ 75,000.00 |
| | Cr) | 544101 | SYNFM | Syndication Fee/Mgr | $ 25,000.00 |
| | Cr) | 415504 | FHAD | Fee Held Awaiting Disposition | $100,000.00 |
| Day 4 | Dr) | 415503 | UNFDS | Unfunded Discount | $ 75,000.00 |
| | Cr) | 415001 | DISC | Position Discount | $ 75,000.00 |
| Month | Dr) | 512007 | AINTI | Amort Interest Income-Origin. Fees | $ 15,000.00 |

JP GAAP Journal Entries

| | Dr/Cr | GL_AC NO | LS2 GL Short | Description | Amount |
|---|---|---|---|---|---|
| Day 1 | Dr) | 423001 | MT/DDA | Nostro Clearing | $100,000.00 |
| | Cr) | 544302 | N/A | Upfront Fee Income | $100,000.00 |
| Day 2 | Dr) | 423001 | MT/DDA | Nostro Clearing | $ 50,000.00 |
| | Cr) | 544302 | N/A | Upfront Fee Income | $ 50,000.00 |
| Day 3 | Dr) | 423001 | MT/DDA | Nostro Clearing | $ 50,000.00 |
| | | | | N/A | $— |
| Day 3 | | | | N/A | $— |
| Day 4 | | | | N/A | |
| | | | | N/A | $— |
| Month | | | | N/A | $— |

TABLE 1-continued

UPFEE

| | | | | | | | | | |
|---|---|---|---|---|---|---|---|---|---|
| Amortization of Upfront Fee for Host's Share (Term Loan) Month 1, 2, 3, 4 | Cr) | 512007 AINTI | Amort Interest Income-Origin. Fees | $ 15,000.00 Cr) | 415001 DISC | Position Discount | $15,000.00 Cr) | N/A | | $— |
| Amortization of Upfront Fee for Host's Share (Revolving Loan) | Dr) Cr) | 415001 DISC 544004 ACOMF | Position Discount Amort Commitment Fee Income | $ 15,000.00 Dr) $ 15,000.00 Cr) | 544004 ACOMF 415001 DISC | Amort Commitment Fee Income Position Discount | $15,000.00 Dr) $15,000.00 Cr) | N/A | | $— |
| Sale of Facility | Dr) Dr) Dr) Cr) | 423001 MT/DDA 415001 DISC 657001 LSOSL 177001 PRINC | Nostro Clearing Position Discount Loss on Sale Loan Principal Amount | $ 980,000.00 Dr) $ 15,000.00 Cr) $ 5,000.00 $1,000,000.00 | 657001 LSOSL 415001 DISC | Loss on Sale Position Discount | $15,000.00 Dr) $15,000.00 Cr) | 423001 MT/DDA 657001 LSOSL 177001 PRINC | Nostro Clearing Loss on Sale Loan Principal Amount | $ 980,000.00 $ 20,000.00 $1,000,000.00 |
| Charge-Off of Loan | Dr) Dr) Cr) | 671001 ALLOW 415001 DISC 177001 PRINC | Loss on Charge Off Position Discount Loan Principal Amount | $ 985,000.00 Dr) $ 15,000.00 Cr) $1,000,000.00 | 671001 ALLOW 415001 DISC | Loss on Charge Off Position Discount | $15,000.00 Dr) $15,000.00 Cr) | 671001 ALLOW 177001 PRINC | Loss on Charge Off Loan Principal Amount | $1,000,000.00 $1,000,000.00 |

TABLE II

Upfront Fee Related Accounts:
LS2 GL Short Name = DISC

415001 Discount Accrual Loan on Certificate (HFI)
415002 Discount Non Accrual Loan on Certificate (HFI)
415003 Discount Accrual Loan on Note - Regular (HFI)
415004 Discount Non Accrual Loan on Note - Regular (HFI)
415005 Discount Accrual Loan on Note - Acceptance (HFI)
415006 Discount Non Accrual Loan on Note - Acceptance (HFI)
415007 Discount Accrual Loan on Note - Employee (HFI)
415008 Discount Non Accrual Loan on Note - Employee (HFI)
415009 Discount Accrual - Special Overdraft
415010 Discount Non Accrual - Special Overdraft
415011 Discount Accrual - Account Receivable Purchase
415012 Discount Non Accrual - Account Receivable Purchase
415013 Discount Accrual - Commercial Bill
415014 Discount Non Accrual - Commercial Bill
415301 Discount Accrual Loan on Certificate (HFS)
415302 Discount Non Accrual Loan on Certificate (HFS)
415303 Discount Accrual Loan on Note - Regular (HFS)
415304 Discount Non Accrual Loan on Note - Regular (HFS)
415305 Discount Accrual Loan on Note - Acceptance (HFS)
415306 Discount Non Accrual Loan on Note - Acceptance (HFS)
LS2 GL Short Name = DFHAD 415505 Deferred Fees Held
LS2 GL Short Name = PRDIS 415401 Prem./Discount Accrual Loan on Certificate (Trading)
415402 Prem./Discount Non Accrual Loan on Certificate (Trading)
415403 Prem./Discount Accrual Loan on Note - Regular (Trading)
415404 Prem./Discount Non Accrual Loan on Note - Recular (Trading)
415405 Prem./Discount Accrual Loan on Note - Acceptance (Trading)
415406 Prem./Discount Non Accrual Loan on Note - Acceptance (Trading)
LS2 Short Name = PRMUM 231501 Premium Accrual (HFI) Loan on Certificate
231502 Premium Non Accrual (HFI) Loan on Certificate
231503 Premium Accrual (HFI) Loan on Note - Regular
231504 Premium Non Accrual (HFI) Loan on Note - Regular
231505 Premium Accrual (HFI) Loan on Note - Acceptance
231506 Premium Non Accrual (HFI) Loan on Note - Acceptance
231507 Premium Accrual (HFI) Loan on Note - Employee
231508 Premium Non Accrual (HFI) Loan on Note - Employee
231511 Premium Accrual - Account Receivable Purchase
231512 Premium Non Accrual - Account Receivable Purchase
231513 Premium Accrual - Special Overdraft
231514 Premium Non Accrual - Special Overdraft
231515 Premium Accrual - Commercial Bill
231516 Premium Non Accrual - Commercial Bill
231601 Premium Accrual (HFS) Loan on Certificate
231602 Premium Non Accrual (HFS) Loan on Certificate
231603 Premium Accrual (HFS) Loan on Note - Regular
231604 Premium Non Accrual (HFS) Loan on Note - Regular
231605 Premium Accrual (HFS) Loan on Note - Acceptance
231606 Premium Non Accrual (HFS) Loan on Note - Acceptance
LS2 GL Short Name = SYNFC 544201 Syndication Fee/CO-MNGR
LS2 GL Short Name = SYNFM 544101 Syndication Fee/MNGR
LS2 GL Short Name = UNFDS 415503 Unfunded Discount
LS2 GL Short Name = FHAD 415504 Fees Held Awaiting Disposition
Upfront Fee Income Accounts:

511007 Amortized Interest Income (HFI) Loan on Note - Regular
511008 Amortized Interest Income (HFI) Loan on Note - Acceptance
511009 Amortized Interest Income (HFI) Loan on Note - Employee
511303 Amortized Interest Income (HFS) Loan on Note - Regular
511304 Amortized Interest Income (HFS) Loan on Note - Acceptance
512007 Amortized Interest Income (HFI) Loan on Certificate
512303 Amortized Interest Income (HFS) Loan on Certificate
513003 Amortized Interest Income - Special Overdraft
515003 Amortized Interest Income - Commercial Bill
534503 Amortized Interest Income - Account Receivable Purchase
544004 Amortized Commitment Fees
544301 Upfront Loan Fee Income (Loan on Note)
544302 Upfront Loan Fee Income (Loan on Certificate)
544303 Upfront Fee Income (Other)
Gain and Loss on Sale of Loan Accounts:
LS2 GL Short Name = RLPL 555001 Realized P/L Accrual (Trading) Loan
555002 Realized P/L Non Accrual (Trading) Loan
LS2 GL Short Name = GNOLS 566001 Gain on Sale Loan (HFI)
566003 Gain On Sale - Special OD
566004 Gain On Sale - Commercial Bill
566301 Gain On Sale Loan (HFS)
567001 Gain On Sale - AR Purchase
LS2 GL Short Name = LSOSL 657001 Loss On Sale (HFI) Loan
657003 Loss On Sale - Special OD
657004 Loss On Sale - Commercial Bill
657301 Loss On Sale (HFS) Loan
658001 Loss On Sale - AR Purchase
LS2 GL Short Name = ALLOW 671001 Loss on Charge Off (LS2)

TABLE III

GAIN/LOSS

| | Prem/Disc | Gain on Sale | | Loss on Sale | | | ADJ Gain | ADJ Loss | US Entries | | | Conversion Entries | | | JP Entries | | |
|---|---|---|---|---|---|---|---|---|---|---|---|---|---|---|---|---|---|
| | | A | B | | C | | Max(A−C,0) | Min(A,C) | | Dr | Cr | | Dr | Cr | | Dr | Cr |
| Sale of Loan with Premium | Dr/Cr | | | DR=1, CR=2 | | | | | | | | | | | | | |
| | | | | Regular Entries | | | | | | | | | | | | | |
| | 2 | $1,000 | 1 | $— | 2 | $1,500 | 2 | $— | 2 | $1,000 | | Loss | 1500 Premium Net Cash | 1000 Premium 500 | | 1000 Loss | 1000 Net Cash | 500 |
| | 2 | $1,000 | 1 | $— | 2 | $ 500 | 2 | $ 500 | 2 | $ 500 | | Loss Net Cash | 500 Premium 500 | 1000 Premium | | 1000 Loss Gain | 500 Net Cash 500 | 500 |
| | 2 | $1,000 | 2 | $500 | 2 | $— | 2 | $1,000 | 2 | $— | | Net Cash | 1500 Premium Gain | 1000 Premium 500 | | 1000 Gain | 1000 Net Cash | 1500 |
| | 2 | $1,000 | 2 | $1,500 | 2 | $— | 2 | $1,000 | 2 | $— | | Net Cash | 2500 Premium Gain | 1000 Premium 1500 | | 1000 Gain | 1000 Net Cash | 2500 |
| Reverse of Sale of Loan with Discount | Dr/Cr | A | B | | C | | Min(A,B) | Max(A−B,0) | | | | | | | | | |
| | | | | Reversal Entries | | | | | | | | | | | | | |
| | 2 | $1,000 | 2 | $— | 2 | $1,500 | 2 | $— | 2 | $1,000 | | Net Cash | 2500 Discount Loss | 1000 Discount 1500 | | 1000 Net Cash | 2500 Loss | 1500 |
| | 2 | $1,000 | 2 | $— | 2 | $ 500 | 2 | $1,000 | 2 | $— | | Net Cash | 1500 Discount Loss | 1000 Discount 500 | | 1000 Net Cash | 1500 Loss | 500 |
| | 2 | $1,000 | 1 | $500 | 2 | $— | 2 | $ 500 | 2 | $— | | Net Cash Gain | 500 Discount 500 | 1000 Discount | | 500 Net Cash 500 | 500 Loss | |
| | 2 | $1,000 | 1 | $1,500 | 2 | $— | 2 | $1,000 | 2 | $— | | Gain | 1500 Discount Net Cash | 1000 Discount 500 | | 1000 Gain | 500 Net Cash | 500 |
| Sale of Loan with Discount | Dr/Cr | A | B | | C | | Min(A,B) | Max(A−B,0) | | | | | | | | | |
| | | | | Regular Entries | | | | | | | | | | | | | |
| | 1 | $1,000 | 1 | $— | 1 | $1,500 | 1 | $— | 1 | $1,000 | | Discount Loss | 1000 Net Cash 1500 | 2500 Loss | | 1000 Discount | 1000 Loss | 2500 Net Cash |
| | 1 | $1,000 | 1 | $— | 1 | $ 500 | 1 | $— | 1 | $1,000 | | Discount Loss | 1000 Net Cash 500 | 1500 Loss | | 1000 Discount | 1000 Loss | 1500 Net Cash |
| | 1 | $1,000 | 2 | $500 | 1 | $— | 1 | $ 500 | 1 | $ 500 | | Discount | 1000 Net Cash Gain | 500 Gain 500 Loss | | 500 Discount 500 | 1000 Loss | 500 Net Cash |

TABLE III-continued

| | | Prem/ Disc | | Gain on Sale | | Loss on Sale | | ADJ Gain | | ADJ Loss | US Entries | | Conversion Entries | JP Entries | |
|---|---|---|---|---|---|---|---|---|---|---|---|---|---|---|---|
| | 1 | $1,000 | 2 | $1,500 | | $— | 1 | $1,000 | 1 | $— Net Cash | Discount 500 | 1000 Gain | 1500 Gain | 1000 Net Cash 1000 Discount | 500 Gain 500 |

Reverse of Sale of Loan with Premium

| | Dr/Cr | A | | B | | C | | Max (A − C, 0) | | Min (A, C) | | | | | |
|---|---|---|---|---|---|---|---|---|---|---|---|---|---|---|---|

Reversal Entries

| | 1 | $1,000 | | $— | | $1,500 | 1 | $— | 1 | $1,000 | Premium Net Cash Premium | 1000 Loss 500 1000 Loss Net Cash 1000 Net Cash 500 | 1500 Loss 500 Loss 500 Gain | 1000 Premium 500 Premium 500 | 1000 Net Cash 500 Loss 500 Net Cash |
| | 1 | $1,000 | 2 | $— | | $ 500 | 1 | $ 500 | 1 | $ 500 | Premium Gain | | 1500 Gain | 1000 Premium | 1000 Gain 1500 Net Cash |
| | 1 | $1,000 | 1 | $ 500 | 1 | $— | 1 | $1,000 | 1 | $— | Premium Gain | 1000 Net Cash 500 | | 1000 Premium | 1000 Gain |
| | 1 | $1,000 | 1 | $1,500 | 1 | $— | 1 | $1,000 | 1 | $— | Premium Gain | 1000 Net Cash 1500 | 2500 Gain | 1000 Premium | 1000 Gain 2500 Net Cash |

TABLE IV

HFS

Journal Entries for Loan Held for Sale

| | | Available Position | Open Sale Position | Total Position |
|---|---|---|---|---|
| Loan Purchased | | | | |
| Cost | at Day 1 | $500,000.00 | $500,000.00 | $1,000,000.00 |
| Market Price | at Day 2 | $485,000.00 | $485,000.00 | $ 970,000.00 |
| | | $490,000.00 | $490,000.00 | $ 980,000.00 |
| Allowance for Loan Revaluation | | | | |
| Provision | | $ 15,000.00 | $ 15,000.00 | $ 30,000.00 |
| Reversal | | — | $— | $— |
| Balance at Day 1 | | $ 15,000.00 | $ 15,000.00 | $ 30,000.00 |
| Provision | | $ 10,000.00 | $ 15,000.00 | $ 25,000.00 |
| Reversal | | $(15,000.00) | $(15,000.00) | $(30,000.00) |
| Balance at Day 2 | | $ 10,000.00 | $ 15,000.00 | $ 25,000.00 |

| | U/S GAAP Journal Entries | | | | | | GAAP Conversion Journal Entries | | | | | | JP GAAP Journal Entries | | | | |
|---|---|---|---|---|---|---|---|---|---|---|---|---|---|---|---|---|---|
| | Dr/Cr | GLAC NO | LS2 GL Short | Description | Amount | Dr/Cr | Dr/Cr | GLAC NO | LS2 GL Short | Description | Amount | Dr/Cr | GLAC NO | LS2 GL Short | Description | Amount |
| Day 1 Reversal of Previous Day's Reserve | Dr) | 428001 | MTM | LOCOM Valuation - Accrual | $ 30000.00 | Dr) | | | | | | | N/A | N/A | N/A | $— |
| | Cr) | 658502 | URPLA | Unrealized P/L - Accrual - Available (HFS) Loan | $15,000.00 | Dr) | 658502 | URPLA | Unrealized P/L - Accrual - Available (HFS) Loan | $15,000.00 | Dr) | N/A | N/A | N/A | N/A | $— |
| | Cr) | 658501 | URPLC | Unrealized P/L - Accrual - Open Sales - (HFS) Loan | $15,000.00 | Cr) | 658501 | URPLC | Unrealized P/L - Accrual - Open Sales - (HFS) Loan | $15,000.00 | Cr) | N/A | N/A | N/A | N/A | $— |
| | | | | | | | 428001 | MTM | LOCOM Valuation - Accrual | $30,000.00 | Cr) | N/A | N/A | N/A | N/A | $— |
| Day 2 Provision of Today's Reserve | Dr) | 658502 | URPLA | Unrealized P/L - Accrual - Available (HFS) Loan | $10,000.00 | Dr) | 428001 | MTM | LOCOM Valuation - Accrual | $25,000.00 | Dr) | N/A | N/A | N/A | N/A | $— |
| | Dr) | 658501 | URPLC | Unrealized P/L - Accrual - Open Sales - (HFS) Loan | $15,000.00 | Cr) | 658502 | URPLA | Unrealized P/L - Accrual - Available (HFS) Loan | $10,000.00 | Cr) | N/A | N/A | N/A | N/A | $— |
| | Cr) | 428001 | MTM | LOCOM Valuation - Accrual | $25,000.00 | Cr) | 658501 | URPLC | Unrealized P/L - Accrual - Open Sales - (HFS) Loan | $15,000.00 | Cr) | N/A | N/A | N/A | N/A | $— |

TABLE IV-continued

HFS

Plan A

| | | | DR/(CR) | | | ADJ Loss | | US Entries | | Conversion Entries | | JP Entries | |
|---|---|---|---|---|---|---|---|---|---|---|---|---|---|
| Outstanding | Net Fee AC | Gain on Sale | Loss on Sale | AJD Gain | ADJ Loss | | | | | | | | |
| | A | B | C | Min (A + C, 0) | Max (A, −C) | | | | | | | | |
| | | | Regular Entries | | | | | | | | | | |
| Net Dr Loss Recog | $(1,000) | $— | $1,500 | $— | $(1,000) | Loss | | 1500 Premium Net Cash | 500 | 1000 Loss | | 1000 Loss | 500 Net Cash 500 |
| | $(1,000) | $— | $500 | $(500) | $(500) | Loss Net Cash | | 500 Premium 500 | | 1000 Loss Gain | | 500 Loss 500 Net Cash | 0 Gain 500 |
| | $(1,000) | $(500) | $— | $(1,000) | $— | Net Cash | | 1500 Premium Gain | | 1000 Gain | | 1000 Net Cash | 1500 Gain 1500 |
| | $(1,000) | $(1,500) | $— | $(1,000) | $— | Net Cash | | 2500 Premium Gain | | 1000 Gain 1500 | | 1000 Net Cash | 2500 Gain 2500 |
| | A | B | C | Max (A, −B) | Min (A + B, 0) | | | | | | | | |
| | | | Reversal Entries | | | | | | | | | | |
| Reverse of Gain | $(1,000) | $— | $(1,500) | $— | $(1,000) | Net Cash | | 2500 Discount Loss 1500 | | 1000 Loss | | 1000 Net Cash | 2500 Loss 2500 |
| | $(1,000) | $— | $(500) | $— | $(1,000) | Net Cash | | 1500 Discount Loss 500 | | 1000 Loss | | 1000 Net Cash | 1500 Loss 1500 |
| | $(1,000) | $500 | $— | $(500) | $(500) | Net Cash Gain | | 500 Discount 500 | | 1000 Loss Gain | | 500 Net Cash 500 | 500 Loss 500 |
| | $(1,000) | $1,500 | $— | $(1,000) | $— | Discount Gain | | 1500 Discount Net Cash 500 | | 1000 Gain | | 1000 Gain | 500 Net Cash 500 |
| | A | B | C | Min (A, −B) | Max (A + B, 0) | | | | | | | | |
| | | | Regular Entries | | | | | | | | | | |
| Net Cr | $1,000 | $— | $1,500 | $— | $1,000 | Discount Loss | | 1000 Net Cash 1500 | | 1000 Discount | | 1000 Loss | 2500 Net Cash 2500 |
| | $1,000 | $— | $500 | $— | $1,000 | Discount Loss | | 1000 Net Cash 500 | | 1000 Discount | | 1000 Loss | 1500 Net Cash 1500 |
| | $1,000 | $(500) | $— | $500 | $500 | Discount | | 1000 Net Cash Gain 500 | | 500 Discount 500 | | 1000 Loss | 500 Net Cash 500 |
| | $1,000 | $(1,500) | $— | $1,000 | $— | Discount Net Cash | | 1000 Gain 500 | | 1000 Discount | | 1000 Net Cash | 500 Gain 500 |

TABLE IV-continued

| | | | | | | | HFS | | | |
|---|---|---|---|---|---|---|---|---|---|---|
| | | A | B | C | Max (A + C, 0) | Min (A, −C) | | | | |
| | | | | Reversal Entries | | | | | | |
| Reverse of Loss | | $1,000 | $— | $(1,500) | $— | $1,000 | 1500 Loss | 1000 Premium | 1000 Net Cash | 500 Loss | 500 |
| | | $1,000 | $— | $(500) | $500 | $500 | 500 Loss<br>500 Gain | 500 Premium<br>500 | 1000 Gain | 500 Net Cash | 500 |
| | | $1,000 | $500 | $— | $1,000 | $— | 1500 Gain | 1000 Premium | 1000 Gain | 1500 Net Cash | 1500 |
| | | $1,000 | $1,500 | $— | $1,000 | $— | 2500 Gain | 1000 Premium | 1000 Gain | 2500 Net Cash | 2500 |

| | | | | | | | Plan B | | | |
|---|---|---|---|---|---|---|---|---|---|---|
| Outstanding | | Net Fee AC | Gain on Sale | Loss on Sale | AJD Gain | ADJ Loss | US Entries | Conversion Entries | JP Entries | | |
| | | | | DR = 1, CR = 2 | | | | | | | |
| | | | | | Max (A − C, 0) | Min (A, C) | | | | | |
| | | | | Regular Entries | | | | | | | |
| Net Dr | 2 | $1,000 | 0 | 1 $1,500 | 2 $— | 2 | 1500 Loss | 1000 Premium<br>500 | 1000 Loss | 500 Net Cash | 500 |
| Loss Recog | 2 | $1,000 | 0 | 1 $ 500 | 2 $ 500 | $ 500 | 500 Loss<br>Net Cash | 1000 Premium<br>500 | 500 Loss<br>500 Net Cash | 0 Gain<br>500 | 500 |
| | 2 | $1,000 | 2 $ 500 | 0 $— | 2 $1,000 | $— | 1500 Premium<br>Gain | 1000 Premium<br>500 | 1000 Net Cash | 1500 Gain | 1500 |
| | 2 | $1,000 | 2 $1,500 | 0 $— | 2 $ 1,000 | $— | 2500 Premium<br>Gain | 1000 Premium<br>1500 | 1000 Net Cash | 2500 Gain | 2500 |

| | | A | B | C | Min (A, B) | Max (A − B, 0) | | | | |
|---|---|---|---|---|---|---|---|---|---|---|
| | | | | Reversal Entries | | | | | | |
| Reverse of Gain | 2 | $1,000 | $— | 2 $1,500 | 2 $— | 2 | $1,000 Net Cash | 2500 Discount<br>Loss | 1000 Loss | 1000 Net Cash | 2500 Loss | 2500 |
| | 2 | $1,000 | $— | 2 $ 500 | 2 $— | 2 | $1,000 Net Cash | 1500 Discount<br>Loss | 1000 Loss | 1000 Net Cash | 1500 Loss | 1500 |
| | 2 | $1,000 | 2 $ 500 | 0 $— | 2 $ 500 | 2 | $ 500 Net Cash<br>Gain | 500 Discount<br>500 | 1000 Loss<br>Gain | 500 Net Cash<br>500 | 500 Loss | 500 |
| | 2 | $1,000 | 2 $1,500 | 1 $— | 2 $1,000 | 2 | $— Gain | 1500 Discount<br>500 | 1000 Gain | 1000 Gain | 500 Net Cash | 500 |

TABLE IV-continued

| | | A | | B | | C | | Min (A, B) | | Max (A − B, 0) | | HFS | | | | | |
|---|---|---|---|---|---|---|---|---|---|---|---|---|---|---|---|---|---|
| | | | | | | Regular Entries | | | | | | | | | | | |
| Net Cr | | $1,000 | 1 | $— | 1 | $1,500 | 1 | $— | 1 | $1,000 | Discount Loss | 1000 Net Cash 1500 | 2500 Loss | 1000 Discount | 1000 Loss | 2500 Net Cash | 2500 |
| | | $1,000 | 1 | $— | 1 | $ 500 | 1 | $— | 1 | $1,000 | Discount Loss | 1000 Net Cash 500 | 1500 Loss | 1000 Discount | 1000 Loss | 1500 Net Cash | 1500 |
| | | $1,000 | 2 | $ 500 | 1 | $— | 1 | $ 500 | 1 | $ 500 | Discount | 1000 Net Cash Gain | 500 Gain 500 Loss | 500 Discount 500 | 1000 Loss | 500 Net Cash | 500 |
| | | $1,000 | 2 | $1,500 | 1 | $— | 1 | $1,000 | 1 | $— | Discount Net Cash | 1000 Gain 500 | 1500 Gain | 1000 Discount | 1000 Net Cash | 500 Gain | 500 |
| | | A | | B | | C | | Max (A − C, 0) | | Min (A, C) | | | | | | | |
| | | | | | | Reversal Entries | | | | | | | | | | | |
| Reverse of Loss | | $1,000 | 1 | $— | 2 | $1,500 | 1 | $— | 1 | $1,000 | Premium Net Cash | 1000 Loss 500 | 1500 Loss | 1000 Premium | 1000 Net Cash | 500 Loss | 500 |
| | | $1,000 | 1 | $— | 2 | $ 500 | 1 | $500 | 1 | $ 500 | Premium | 1000 Loss Net Cash | 500 Loss 500 Gain | 500 Premium 500 | 1000 Gain | 500 Net Cash | 500 |
| | | $1,000 | 1 | $ 500 | 1 | $— | 1 | $1,000 | 1 | $— | Premium Gain | 1000 Net Cash 500 | 1500 Gain | 1000 Premium | 1000 Gain | 1500 Net Cash | 1500 |
| | | $1,000 | 1 | $1,500 | 1 | $— | 1 | $1,000 | 1 | $— | Premium Gain | 1000 Net Cash 1500 | 2500 Gain | 1000 Premium | 1000 Gain | 2500 Net Cash | 2500 |

TABLE V

TRA

Journal Entries for Trading Loan

| Loan Purchased | | Available Position | Open Sale Position | Total Position |
|---|---|---|---|---|
| Cost | At Day 1 | $500,000.00 | $500,000.00 | $1,000,000.00 |
| Market Price | At Day 2 | $550,000.00 | $550,000.00 | $1,100,000.00 |
| | Recognition | $520,000.00 | $520,000.00 | $1,040,000.00 |
| | Reversal | $ 50,000.00 | $ 50,000.00 | $ 100,000.00 |
| | Balance at Day 1 | $ — | $ — | $ — |
| | Recognition | $ 50,000.00 | $ 50,000.00 | $ 100,000.00 |
| | Reversal | $ 20,000.00 | $ 20,000.00 | $ 40,000.00 |
| | Balance at Day 2 | $(50,000.00) | $(50,000.00) | $(100,000.00) |
| | | $ 20,000.00 | $ 20,000.00 | $ 40,000.00 |

| | | US GAAP Journal Entries | | | | | GAAP Conversion Journal Entries | | | | | JP GAAP Journal Entries | | | | |
|---|---|---|---|---|---|---|---|---|---|---|---|---|---|---|---|---|
| | Dr/Cr | GL AC NO | LS2 GL Short | Description | Amount | Dr/Cr | GL AC NO | LS2 GL Short | Description | Amount | Dr/Cr | GL AC NO | LS2 GL Short | Description | Amount |
| Day 1 Reversal of Previous Day's Unrealized Gain (Loss) | Dr) | 555502 | URPLA | Unrealized P/L - Accrual - Available (Trading) Loan | $ 50,000.00 Dr | 428501 | MTM | Mark to Market Valuation - Accrual | $100,000.00 Dr | N/A | N/A | N/A | N/A | $— |
| | Dr) | 555501 | URPLC | Unrealized P/L - Accrual - Open Sales - (Trading) Loan | $ 50,000.00 Cr | 555502 | URPLA | Unrealized P/L - Accrual - Available (Trading) Loan | $ 50,000.00 Cr | N/A | N/A | N/A | N/A | $— |
| | Cr) | 428501 | MTM | Mark to Market Valuation - Accrual | $100,000.00 Cr | 555501 | URPLC | Unrealized P/L - Accrual - Open Sales - (Trading) Loan | $ 50,000.00 Cr | N/A | N/A | N/A | N/A | $— |
| Day 2 Recognition of Today's Unrealized Gain(Loss) | Dr) | 428501 | MTM | Mark to Market Valuation - Accrual | $ 40,000.00 Dr | 555502 | URPLA | Unrealized P/L - Accrual - Available (Trading) Loan | $ 20,000.00 Dr | N/A | N/A | N/A | N/A | $— |
| | Cr) | 555502 | URPLA | Unrealized P/L - Accrual - Available (Trading) Loan | $ 20,000.00 Dr | 555501 | URPLC | Unrealized P/L - Accrual - Open Sales - (Trading) Loan | $ 20,000.00 Cr | N/A | N/A | N/A | N/A | $— |
| | Cr) | 555501 | URPLC | Unrealized P/L - Accrual - Open Sales - (Trading) Loan | $ 20,000.00 Cr | 428501 | MTM | Mark to Market Valuation - Accrual | $ 40,000.00 Cr | N/A | N/A | N/A | N/A | $— |

TABLE VI

SBLC

Journal Entries for SBLC Sold

| | | |
|---|---|---|
| Issuance of SBLC & Guar | Day 1 | SBLC $100,000.00 |
| | | Guarantee $100,000.00 |
| Part-out of SBLC and Gua | Day 2 | SBLC $ 50,000.00 |
| | | Guarantee $ 50,000.00 |
| Buy Back of SBLC and Guarantee Part-Out | Day 3 | SBLC $ 30,000.00 |
| | | Guarantee $ 30,000.00 |
| Maturity of SBLC and Gu | Day 4 | SBLC $ 80,000.00 |
| | | Guarantee $ 20,000.00 |
| | | SBLC - Sold $ 80,000.00 |
| | | Guarantee - Sold $ 20,000.00 |

US GAAP Journal Entries

| | Dr/Cr | GLAC NO | LS2 GL Short | Description | Amount |
|---|---|---|---|---|---|
| Issuance of SBLC and Guarantee | Dr) | 292001 | LCPRN | L/C Outstanding - Guarantee | $100,000.00 Dr |
| | Dr) | 291001 | LCPRN | L/C Outstanding - SBLC | $100,000.00 Cr |
| | Cr) | 491001 | LCCON | L/C Outstanding - Offset Account | $200,000.00 |
| Sale of SBLC and Guarantee | Dr) | 292501 | LCSLD | L/C Outstanding - Guarantee Sold | $ 50,000.00 |
| | Dr) | 291501 | LCSLD | L/C Outstanding - SBLC Sold | $ 50,000.00 |
| | Cr) | 292001 | LCPRN | L/C Outstanding - Guarantee | $ 50,000.00 |
| | Cr) | 291001 | LCPRN | L/C Outstanding - SBLC | $ 50,000.00 |
| Buy Back of SBLC and Guarantee | Dr) | 292001 | LCPRN | L/C Outstanding - Guarantee | $ 30,000.00 Dr |
| | Dr) | 291001 | LCPRN | L/C Outstanding - SBLC | $ 30,000.00 Cr |
| | Cr) | 292501 | LCSLD | L/C Outstanding - Guarantee Sold | $ 30,000.00 |

GAAP Conversion Journal Entries

| | Dr/Cr | GLAC NO | LS2 GL Short | Description | Amount |
|---|---|---|---|---|---|
| Issuance of SBLC and Guarantee | Dr) | | | N/A | |
| | Dr) | | | N/A | |
| | Cr) | 491001 | LCCON | L/C Outstanding - Offset Account | $100,000.00 Dr |
| Sale of SBLC and Guarantee | Dr) | 491501 | N/A | SBLC & Guarantee Offset Sold | $100,000.00 Dr |
| | Cr) | | | | |
| | Cr) | 491501 | N/A | SBLC & Guarantee Offset Sold | $ 60,000.00 Dr |
| | Dr) | 491001 | LCCON | L/C Outstanding - Offset Account | $ 60,000.00 Dr |
| Buy Back of SBLC and Guarantee | Cr) | | | | |

JP GAAP Journal Entries

| | Dr/Cr | GLAC NO | LS2 GL Short | Description | Amount |
|---|---|---|---|---|---|
| Issuance of SBLC and Guarantee | Dr) | 292001 | LCPRN | L/C Outstanding - Guarantee | $100,000.00 |
| | Dr) | 291001 | LCPRN | L/C Outstanding - SBLC | $100,000.00 |
| | Cr) | 491001 | LCCON | L/C Outstanding - Offset Account | $200,000.00 |
| Sale of SBLC and Guarantee | Dr) | 292501 | LCSLD | L/C Outstanding - Guarantee Sold | $ 50,000.00 |
| | Dr) | 291501 | LCSLD | L/C Outstanding - SBLC Sold | $ 50,000.00 |
| | Cr) | 292001 | LCPRN | L/C Outstanding - Guarantee | $ 50,000.00 |
| | Cr) | 291001 | LCPRN | L/C Outstanding - SBLC | $ 50,000.00 |
| | Dr) | 491001 | LCCON | L/C Outstanding-Offset Account | $100,000.00 |
| | Cr) | 491501 | N/A | SBLC & Guarantee Offset Sold | $100,000.00 |
| Buy Back of SBLC and Guarantee | Dr) | 292001 | LCPRN | L/C Outstanding - Guarantee | $ 30,000.00 |
| | Dr) | 291001 | LCPRN | L/C Outstanding - SBLC | $ 30,000.00 |
| | Cr) | 292501 | LCSLD | L/C Outstanding - Guarantee Sold | $ 30,000.00 |

TABLE VI-continued

SBLC

| | | | | | | | | | | | | |
|---|---|---|---|---|---|---|---|---|---|---|---|---|
| | Cr) | 291501 | LCSLD | L/C Outstanding - SBLC Sold | $ 30,000.00 | | Cr) | 291501 | LCSLD | L/C Outstanding - SBLC Sold | $ 30,000.00 |
| | | | | | | | | Dr) | 491501 | N/A | SBLC & Guarantee Offset Sold | $ 60,000.00 |
| | | | | | | | | Cr) | 491001 | LCCON | L/C Outstanding - Offset Account | $ 60,000.00 |
| Maturity of SBLC and Guarantee | Dr) | 491001 | LCCON | L/C Outstanding - Offset Account | $200,000.00 | Dr) | 491501 | N/A | SBLC & Guarantee Offset Sold | $40,000.00 | Dr) | 491001 | LCCON | L/C Outstanding - Offset Account | $160,000.00 |
| | Cr) | 292001 | LCPRN | L/C Outstanding - Guarantee | $ 80,000.00 | Cr) | 491001 | LCCON | L/C Outstanding - Offset Account | $40,000.00 | Dr) | 491501 | N/A | SBLC & Guarantee Offset Sold | $ 40,000.00 |
| | Cr) | 291001 | LCPRN | L/C Outstanding - SBLC | $ 80,000.00 | | | | | | Cr) | 292001 | LCPRN | L/C Outstanding - Guarantee | $ 80,000.00 |
| | Cr) | 292501 | LCSLD | L/C Outstanding - Guarantee Sold | $ 20,000.00 | | | | | | Cr) | 291001 | LCPRN | L/C Outstanding - SBLC | $ 80,000.00 |
| | Cr) | 291501 | LCSLD | L/C Outstanding - SBLC Sold | $ 20,000.00 | | | | | | Cr) | 292501 | LCSLD | L/C Outstanding - Guarantee Sold | $ 20,000.00 |
| | | | | | | | | | | | Cr) | 291501 | LCSLD | L/C Outstanding - SBLC Sold | $ 20,000.00 |

What is claimed is:

1. A computerized management system for converting journal entries from a first reporting standard to a second reporting standard different from the first reporting standard, the system comprising:
   a source of journal entries conforming to the first reporting standard, each journal entry comprising classification information for classifying the journal entry;
   a rules database comprising one or more rules tables for storing conversion rules for converting journal entries from the first reporting standard to the second reporting standard; and
   a processor programmed as a conversion engine for generating journal entries for a first set-of-books based on the journal entries from the source of journal entries, wherein the journal entries for the first set-of-books conform to the second reporting standard, the processor being programmed to:
   access a journal entry from the source of journal entries;
   determine whether any of the conversion rules stored in the rules database are applicable to the accessed journal entry in dependence on the classification information of the accessed journal entry, and, if so, applying the applicable conversion rule to the accessed journal entry, thereby converting the journal entry from the first reporting standard to the second reporting standard; and
   generate a journal entry for a second set-of-books, wherein the journal entry for the second set-of-books reflects adjustments resulting from the converting of the accessed journal entry from the first reporting standard to the second reporting standard.

2. The system according to claim 1, wherein the rules database comprises:
   an exclusion rules table for storing conversion rules relating to journal entry types that are excluded or need to be reversed in the second reporting standard; and
   a reclassification rules table for storing conversion rules relating to journal entry types that require reclassification.

3. The system according to claim 2, further comprising:
   an adjustment table for storing, for each type of journal entry requiring conversion, classification information for that journal entry type and an associated conversion rule type, and
   wherein the processor is further programmed to:
   compare the classification information of the accessed journal entry to the classification information in the adjustment table, and, if a match is found:
   determine the associated conversion rule type stored in the adjustment table;
   select one of the exclusion rules table and the reclassification rules table in dependence on the determined conversion rule type;
   retrieve a conversion rule from the selected rules table; and
   apply the retrieved conversion rule to the accessed journal entry, thereby converting the accessed journal entry from the first reporting standard to the second reporting standard.

4. The system according to claim 1, wherein the conversion rules include one or both of exclusion rules and reclassification rules.

5. The system according to claim 1, wherein the first and second reporting standards correspond to first and second different types of generally accepted accounting principles.

6. The system according to claim 1, wherein the first and second reporting standards correspond to first and second different types of statutory accounting requirements.

7. The system according to claim 1, wherein the first and second reporting standards are for first and second different taxing authorities.

8. The system according to claim 1, wherein the first and second reporting standards are for first and second different regulatory authorities.

9. The system according to claim 1, wherein the journal entries conforming to the first reporting standard include journal entries for one or more of loans held for trading; non-performing loans; upfront loan fees; direct loan origination costs; contingent liability; presentation of premium/discount on loans; presentation of allowance for loan losses; and loan balances.

10. A non-transitory computer readable medium storing computer-executable instructions for converting journal entries from a first reporting standard to a second reporting standard different from the first reporting standard, the instructions, when executed by a computer, causing the computer to:
    access journal entries conforming to the first reporting standard, each journal entry comprising classification information for classifying the journal entry;
    generate journal entries conforming to the second reporting standard based on the accessed journal entries by:
    accessing a rules database comprising one or more rules tables for storing conversion rules for converting journal entries from the first reporting standard to the second reporting standard; and
    determining whether any of the conversion rules stored in the rules database are applicable to an accessed journal entry in dependence on the classification information of the accessed journal entry, and, if so, applying the applicable conversion rule to the accessed journal entry, thereby converting the journal entry from the first reporting standard to the second reporting standard; and
    generate a journal entry for a second set-of-books, wherein the journal entry for the second set-of-books reflects adjustments resulting from the converting of the accessed journal entry from the first reporting standard to the second reporting standard.

11. A method of converting journal entries from a first reporting standard to a second reporting standard different from the first reporting standard, the method comprising:
    accessing journal entries conforming to the first reporting standard, each journal entry comprising classification information for classifying the journal entry;
    generating journal entries conforming to the second reporting standard based on the accessed journal entries, wherein the generating of journal entries conforming to the second reporting standard comprises using a conversion engine running on a processing system to:
    access a rules database comprising one or more rules tables for storing conversion rules for converting journal entries from the first reporting standard to the second reporting standard; and
    determine whether any of the conversion rules stored in the rules database are applicable to an accessed journal entry in dependence on the classification information of the accessed journal entry, and, if so, applying the applicable conversion rule to the accessed journal entry, thereby converting the journal entry from the first reporting standard to the second reporting standard; and
    generating a journal entry for a second set-of-books, wherein the journal entry for the second set-of-books reflects adjustments resulting from the converting of the accessed journal entry from the first reporting standard to the second reporting standard.

* * * * *

UNITED STATES PATENT AND TRADEMARK OFFICE
CERTIFICATE OF CORRECTION

PATENT NO. : 8,311,908 B2
APPLICATION NO. : 12/458692
DATED : November 13, 2012
INVENTOR(S) : Maguire, III et al.

Page 1 of 2

It is certified that error appears in the above-identified patent and that said Letters Patent is hereby corrected as shown below:

On sheet 3 of 13, in figure 2B, Below Box 124, line 4, delete "oreaored" and insert -- prepared --, therefor.

In column 1, line 33, delete "principals" and insert -- principles --, therefor.

In column 4, line 5, delete "1Q™" and insert -- IQ™ --, therefor.

In column 4, line 5, delete "L1Q™," and insert -- LIQ™, --, therefor.

In column 4, line 9-29, delete "The general architecture of a management system 100 including a ................account to Oracle GL account numbers." and insert the same on Col. 4 line 10 as a new paragraph.

In column 6, line 7, delete "database—" and insert -- database --, therefor.

In column 12, line 10, delete "IP" and insert -- JP --, therefor.

In column 13, line 67, delete "Position" and insert -- "Position --, therefor.

In column 18, line 7, delete "GAAP,0)" and insert -- GAAP,0). --, therefor.

In column 18, line 18, delete "Unamortized" and insert -- ii) Unamortized --, therefor.

In column 21, line 23, delete "M™" and insert -- MTM --, therefor.

In column 24, line 9, delete "VII." and insert -- VIII. --, therefor.

In column 25, line 57, delete "GAAP," and insert -- GAAP", --, therefor.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,311,908 B2

In column 27-28, line 5 (Table 1), delete "Amortizartion:" and insert -- Amortization: --, therefor.

In column 31, line 28, delete "Recular" and insert -- Regular --, therefor.

In column 33-34, line 20 (Table III), delete "Enries" and insert -- Entries --, therefor.

In column 35-36, line 10 (Table III), delete "Enries" and insert -- Entries --, therefor.

In column 41-42, line 3 (Table IV), delete "Enries" and insert -- Entries --, therefor.

In column 41-42, line 26 (Table IV), delete "Enries" and insert -- Entries --, therefor.

In column 43-44, line 14 (Table IV), delete "Enries" and insert -- Entries --, therefor.

In column 45-46, line 4 (Table V), delete "Coat" and insert -- Cost --, therefor.